(12) United States Patent
Anderson

(10) Patent No.: US 10,225,229 B2
(45) Date of Patent: Mar. 5, 2019

(54) SYSTEMS AND METHODS FOR PRESENTING MESSAGES IN A COMMUNICATIONS SYSTEM

(71) Applicant: GOOGLE LLC, Mountain View, CA (US)

(72) Inventor: Monica Anderson, Los Altos, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 15/434,021

(22) Filed: Feb. 15, 2017

(65) Prior Publication Data

US 2017/0163467 A1 Jun. 8, 2017

Related U.S. Application Data

(60) Continuation of application No. 14/520,229, filed on Oct. 21, 2014, now Pat. No. 9,577,964, which is a
(Continued)

(51) Int. Cl.
*G06F 15/16* (2006.01)
*H04L 12/58* (2006.01)
(Continued)

(52) U.S. Cl.
CPC ............. *H04L 51/34* (2013.01); *G06Q 10/10* (2013.01); *H04L 12/1813* (2013.01);
(Continued)

(58) Field of Classification Search
CPC ............................ H04L 12/1813; H04L 51/26
(Continued)

(56) References Cited

U.S. PATENT DOCUMENTS 3,670,310 A 6/1972 Bharwani et al.
5,706,291 A 1/1998 Kainulainen et al.
(Continued)

FOREIGN PATENT DOCUMENTS

WO WO 01067357 A2 9/2001 ............. G06F 17/60

OTHER PUBLICATIONS

Slashdot. "User Info for maraist". Oct. 19, 2001. p. 1. (Year: 2001).*
(Continued)

*Primary Examiner* — Imad Hussain
(74) *Attorney, Agent, or Firm* — Morgan, Lewis & Bockius LLP

(57) ABSTRACT

The various embodiments described herein include methods, devices, and systems for relaying messages in a communications system. In one aspect, a method is performed at an electronic device. The method includes: (1) obtaining a plurality of messages, including one or more target messages authored by a particular user account; (2) obtaining a determination as to whether the messages includes at least one priority message authored by the particular user account; and (3) in accordance with a determination that the messages includes at least one priority message authored by the particular user account, displaying a user interface including: (a) at least a subset of the one or more target messages; (b) the at least one priority message; and (c) feedback for the at least one priority message, the feedback indicating a popularity of the at least one priority message.

20 Claims, 12 Drawing Sheets

Related U.S. Application Data continuation of application No. 13/676,028, filed on Nov. 13, 2012, now Pat. No. 8,868,669, which is a division of application No. 13/038,295, filed on Mar. 1, 2011, now Pat. No. 8,312,090, which is a continuation of application No. 11/728,318, filed on Mar. 22, 2007, now Pat. No. 7,899,869.

(51) Int. Cl.
*G06Q 10/10* (2012.01)
*H04L 12/18* (2006.01)

(52) U.S. Cl.
CPC .............. *H04L 51/02* (2013.01); *H04L 51/04* (2013.01); *H04L 51/14* (2013.01); *H04L 51/16* (2013.01); *H04L 51/26* (2013.01)

(58) Field of Classification Search
USPC ........................................................ 709/206
See application file for complete search history.

(56) References Cited

U.S. PATENT DOCUMENTS

| | | | |
|---|---|---|---|
| 5,867,799 A | | 2/1999 | Lang et al. |
| 5,880,731 A | | 3/1999 | Liles et al. |
| 5,918,014 A | | 6/1999 | Robinson |
| 6,084,628 A | | 7/2000 | Sawyer |
| 6,161,130 A | * | 12/2000 | Horvitz .............. G06F 17/30707 707/999.005 |
| 6,182,118 B1 | | 1/2001 | Finney et al. |
| 6,212,548 B1 | | 4/2001 | DeSimone et al. |
| 6,275,811 B1 | | 8/2001 | Ginn |
| 6,393,460 B1 | | 3/2002 | Gruen et al. |
| 6,400,381 B1 | | 6/2002 | Barrett et al. |
| 6,480,885 B1 | | 11/2002 | Olivier |
| 6,484,196 B1 | | 11/2002 | Maurille |
| 6,493,703 B1 | * | 12/2002 | Knight .............. G06F 17/30702 |
| 6,515,681 B1 | * | 2/2003 | Knight .................. G06Q 10/107 707/999.003 |
| 6,571,234 B1 | * | 5/2003 | Knight .................... G06Q 10/10 |
| 6,606,644 B1 | | 8/2003 | Ford et al. |
| 6,778,982 B1 | | 8/2004 | Knight et al. |
| 6,781,972 B1 | | 8/2004 | Anderlind et al. |
| 6,782,448 B2 | | 8/2004 | Goodman et al. |
| 6,804,675 B1 | | 10/2004 | Knight et al. |
| 6,975,833 B2 | | 8/2005 | Theilmann et al. |
| 6,978,292 B1 | | 12/2005 | Murakami et al. |
| 7,092,821 B2 | | 8/2006 | Mizrahi et al. |
| 7,124,372 B2 | | 10/2006 | Brin |
| 7,203,704 B1 | * | 4/2007 | Stern .................. G06F 17/30707 707/627 |
| 7,325,034 B2 | * | 1/2008 | Douglis .................. H04L 29/06 370/312 |
| 7,328,242 B1 | | 2/2008 | McCarthy et al. |
| 7,386,799 B1 | | 6/2008 | Clanton et al. |
| 7,421,476 B2 | | 9/2008 | Weaver |
| 7,426,540 B1 | | 9/2008 | Matsumoto et al. |
| 7,478,129 B1 | | 1/2009 | Chemtob |
| 7,574,478 B2 | | 8/2009 | Mittelstaedt et al. |
| 7,577,711 B2 | | 8/2009 | McArdle |
| 7,657,253 B2 | | 2/2010 | Lewis |
| 7,661,067 B2 | | 2/2010 | Chen et al. |
| 7,663,652 B1 | | 2/2010 | Reese |
| 7,689,682 B1 | * | 3/2010 | Eldering ................ G06Q 40/00 709/223 |
| 7,797,168 B2 | | 9/2010 | Kusumoto et al. |
| 7,962,604 B1 | * | 6/2011 | Morris ................... G06Q 30/02 705/14.4 |
| 7,991,764 B2 | * | 8/2011 | Rathod ............. G06F 17/30867 707/713 |
| 8,015,246 B1 | | 9/2011 | Anderson |
| 8,108,464 B1 | | 1/2012 | Rochelle et al. |
| 8,112,310 B1 | * | 2/2012 | Yehoshua ........... G06Q 30/0243 705/14.42 |
| 8,805,933 B2 | | 8/2014 | Moody et al. |
| 8,874,654 B2 | | 10/2014 | Gale et al. |
| 8,954,509 B1 | * | 2/2015 | Hodson ................... H04L 51/04 709/206 |
| 8,990,097 B2 | | 3/2015 | Spivack et al. |
| 2001/0018698 A1 | | 8/2001 | Uchino et al. |
| 2001/0037242 A1 | | 11/2001 | Bataillon et al. |
| 2002/0002586 A1 | | 1/2002 | Rafal et al. |
| 2002/0007396 A1 | | 1/2002 | Takakura et al. |
| 2002/0010641 A1 | | 1/2002 | Stevens et al. |
| 2002/0042733 A1 | * | 4/2002 | Lesandrini ............. G06Q 30/02 705/7.32 |
| 2002/0046099 A1 | | 4/2002 | Frengut et al. |
| 2002/0059098 A1 | * | 5/2002 | Sazawa ............. G06Q 30/0256 705/14.54 |
| 2002/0082923 A1 | | 6/2002 | Merriman et al. |
| 2002/0099775 A1 | | 7/2002 | Gupta et al. |
| 2002/0099777 A1 | | 7/2002 | Gupta et al. |
| 2002/0103867 A1 | | 8/2002 | Schilter |
| 2002/0116458 A1 | | 8/2002 | Bricklin et al. |
| 2002/0156680 A1 | | 10/2002 | Casserly |
| 2003/0014489 A1 | | 1/2003 | Inala et al. |
| 2003/0014490 A1 | | 1/2003 | Bates et al. |
| 2003/0036944 A1 | * | 2/2003 | Lesandrini ............. G06Q 30/02 705/7.32 |
| 2003/0043188 A1 | | 3/2003 | Daron |
| 2003/0097301 A1 | * | 5/2003 | Kageyama ........ G06F 17/30265 705/14.52 |
| 2003/0101227 A1 | | 5/2003 | Fink |
| 2003/0105769 A1 | | 6/2003 | Harris |
| 2003/0120720 A1 | | 6/2003 | Montero |
| 2003/0195801 A1 | * | 10/2003 | Takakura ................ G06Q 30/02 705/14.66 |
| 2003/0195928 A1 | | 10/2003 | Kamijo et al. |
| 2003/0212746 A1 | | 11/2003 | Fitzpatrick et al. |
| 2004/0019637 A1 | | 1/2004 | Goodman et al. |
| 2004/0039779 A1 | * | 2/2004 | Amstrong ............. G06Q 10/10 709/204 |
| 2004/0049539 A1 | | 3/2004 | Reynolds |
| 2004/0054737 A1 | | 3/2004 | Daniell |
| 2004/0064512 A1 | | 4/2004 | Arora et al. |
| 2004/0078444 A1 | | 4/2004 | Malik |
| 2004/0093558 A1 | | 5/2004 | Weaver |
| 2004/0111479 A1 | | 6/2004 | Borden et al. |
| 2004/0128357 A1 | | 7/2004 | Giles et al. |
| 2004/0172405 A1 | | 9/2004 | Farran |
| 2004/0177110 A1 | | 9/2004 | Rounthwaite et al. |
| 2004/0186766 A1 | | 9/2004 | Fellenstein et al. |
| 2004/0193595 A1 | | 9/2004 | Kaminsky et al. |
| 2004/0243580 A1 | | 12/2004 | Markki et al. |
| 2004/0260770 A1 | | 12/2004 | Medlin et al. |
| 2004/0267723 A1 | | 12/2004 | Bharat |
| 2005/0010641 A1 | * | 1/2005 | Staack ................... G06Q 30/02 709/206 |
| 2005/0037809 A1 | | 2/2005 | Guan |
| 2005/0039779 A1 | | 2/2005 | Ohtsuka |
| 2005/0055409 A1 | | 3/2005 | Alsarraf et al. |
| 2005/0076051 A1 | | 4/2005 | Carobus et al. |
| 2005/0080856 A1 | | 4/2005 | Kirsch |
| 2005/0086307 A1 | | 4/2005 | Kelley et al. |
| 2005/0188019 A1 | | 8/2005 | Mittelstaedt et al. |
| 2005/0228983 A1 | * | 10/2005 | Starbuck ................. H04L 63/08 713/151 |
| 2005/0246186 A1 | | 11/2005 | Nikolov |
| 2005/0262214 A1 | | 11/2005 | Bagga et al. |
| 2006/0047666 A1 | | 3/2006 | Bedi et al. |
| 2006/0053230 A1 | | 3/2006 | Montero |
| 2006/0074863 A1 | | 4/2006 | Kishore et al. |
| 2006/0075040 A1 | | 4/2006 | Chmaytelli |
| 2006/0095514 A1 | | 5/2006 | Wang et al. |
| 2006/0123083 A1 | | 6/2006 | Goutte et al. |
| 2006/0136298 A1 | * | 6/2006 | Klein ...................... G06Q 30/02 705/14.54 |
| 2006/0167747 A1 | | 7/2006 | Goodman et al. |
| 2006/0167944 A1 | | 7/2006 | Baker |
| 2006/0167968 A1 | | 7/2006 | Reynolds et al. |
| 2006/0174207 A1 | | 8/2006 | Deshpande |
| 2006/0212567 A1 | | 9/2006 | Gulledge et al. |

(56) References Cited

U.S. PATENT DOCUMENTS

| | | | |
|---|---|---|---|
| 2006/0235932 A1 | 10/2006 | Celi, Jr. et al. | |
| 2006/0242554 A1* | 10/2006 | Gerace | G06F 17/30867 715/209 |
| 2006/0248150 A1 | 11/2006 | Chaar et al. | |
| 2006/0259473 A1* | 11/2006 | Li | G06Q 30/02 |
| 2006/0259923 A1 | 11/2006 | Chiu | |
| 2006/0277053 A1 | 12/2006 | Lobb et al. | |
| 2006/0282328 A1* | 12/2006 | Gerace | G06F 17/30867 705/14.66 |
| 2007/0005694 A1* | 1/2007 | Popkin | H04L 12/1859 709/204 |
| 2007/0022172 A1 | 1/2007 | Anglin et al. | |
| 2007/0043822 A1 | 2/2007 | Brumfield | |
| 2007/0067297 A1 | 3/2007 | Kublickis | |
| 2007/0078675 A1 | 4/2007 | Kaplan | |
| 2007/0083536 A1* | 4/2007 | Darnell | G06F 17/30867 |
| 2007/0083894 A1* | 4/2007 | Gonsalves | G06F 17/3089 725/46 |
| 2007/0088711 A1 | 4/2007 | Craggs | |
| 2007/0094247 A1 | 4/2007 | Chowdhury et al. | |
| 2007/0112630 A1 | 5/2007 | Lau et al. | |
| 2007/0150537 A1 | 6/2007 | Graham | |
| 2007/0156886 A1 | 7/2007 | Srivastava | |
| 2007/0168511 A1 | 7/2007 | Brochu et al. | |
| 2007/0174249 A1* | 7/2007 | James | G06F 17/3089 |
| 2007/0206760 A1 | 9/2007 | Bandhole et al. | |
| 2007/0208583 A1* | 9/2007 | Ward | G06Q 10/00 705/50 |
| 2007/0208610 A1 | 9/2007 | Pisaris-Henderson et al. | |
| 2007/0219794 A1* | 9/2007 | Park | G06Q 10/10 704/246 |
| 2007/0233879 A1 | 10/2007 | Woods et al. | |
| 2007/0255791 A1 | 11/2007 | Bodlaender et al. | |
| 2007/0265921 A1* | 11/2007 | Rempe | G06Q 30/02 705/14.16 |
| 2007/0276956 A1* | 11/2007 | Dorai | H04L 67/26 709/238 |
| 2007/0282940 A1 | 12/2007 | Sakurai | |
| 2007/0294281 A1* | 12/2007 | Ward | G06Q 30/02 |
| 2007/0299935 A1* | 12/2007 | Plastina | G06F 17/3089 709/219 |
| 2008/0071929 A1* | 3/2008 | Motte | G06F 17/3089 709/246 |
| 2008/0077517 A1 | 3/2008 | Sappington | |
| 2008/0086361 A1* | 4/2008 | Eliezerov | G06Q 30/02 705/7.32 |
| 2008/0098071 A1 | 4/2008 | Jones et al. | |
| 2008/0120383 A1 | 5/2008 | Kumar et al. | |
| 2008/0134202 A1 | 6/2008 | Craggs et al. | |
| 2008/0147501 A1 | 6/2008 | Gilliam | |
| 2008/0155693 A1 | 6/2008 | Mikan et al. | |
| 2008/0183541 A1 | 7/2008 | Wenger et al. | |
| 2008/0183815 A1 | 7/2008 | Unger | |
| 2008/0189169 A1 | 8/2008 | Turpin et al. | |
| 2008/0195461 A1 | 8/2008 | Li et al. | |
| 2008/0222241 A1* | 9/2008 | Arvai | G06F 17/30905 709/203 |
| 2009/0037566 A1 | 2/2009 | Hoile et al. | |
| 2009/0066722 A1* | 3/2009 | Kriger | G06Q 30/02 345/619 |
| 2009/0150507 A1 | 6/2009 | Davis et al. | |
| 2009/0276500 A1 | 11/2009 | Karmarkar | |
| 2009/0287786 A1* | 11/2009 | Arav | G06Q 10/107 709/206 |
| 2010/0081462 A1 | 4/2010 | Neria et al. | |
| 2010/0263045 A1 | 10/2010 | Dulitz et al. | |
| 2010/0312643 A1 | 12/2010 | Gil | |
| 2011/0046970 A1* | 2/2011 | Fontenot | G06Q 30/0269 705/2 |
| 2011/0145334 A9 | 6/2011 | Colson et al. | |
| 2011/0320538 A1* | 12/2011 | Ickman | G06F 9/542 709/206 |
| 2012/0060103 A1 | 3/2012 | Arasaki et al. | |
| 2012/0284648 A1* | 11/2012 | Marshall | G06Q 50/01 715/753 |
| 2013/0018964 A1 | 1/2013 | Osipkov et al. | |
| 2013/0212047 A1 | 8/2013 | Lai et al. | |
| 2013/0254314 A1* | 9/2013 | Chow | H04L 67/06 709/206 |
| 2013/0339276 A1 | 12/2013 | Lai et al. | |
| 2015/0200906 A1 | 7/2015 | Ganesh | |
| 2015/0348104 A1 | 12/2015 | Casteel et al. | |
| 2015/0350166 A1 | 12/2015 | Hanson | |
| 2017/0149752 A1 | 5/2017 | Martin et al. | |

OTHER PUBLICATIONS

Simtropolis. "IS it possible to hyperlink images using BBCode?" Mar. 15, 2006. pp. 1-3. (Year: 2006).*
Edelman. Computing the Mind. 2008. pp. xi-36. (Year: 2008).*
Lakoff. Metaphors We Live by. 1980. pp. ix-55. (Year: 1980).*
Goffman. Frame Analysis. 1974. pp. 1-39. (Year: 1974).*
Turing. Computers and Thought, The Imitation Game. 1963. pp. 1-27. (Year: 1963).*
Amazon.com, Recommended for You, Amazon.com, Sep. 3, 2009, 2 pages.
Ars Technica, Anyone else gonna stick with Vista?, Ars Technica, Aug. 23, 2009, 1 page.
Blastfeed-Features, http://www.blastfeed.com, Mar. 17, 2007, 2 pages.
Holwerda, Opera 10 Released, OSnews, Sep. 1, 2009, 2 pages.
MetaFilter, Recent Favorites, MetaFilter, Jun. 14, 2006, 1 page.
MozillaZine, Is there a way to limit the number RSS feed links returned?, mozillaZine, Sep. 3, 2009, pp. 1-4.
Mutton, P. IRC Hacks, 2004, 4 pages.
"RSS" definition, http://en.wikipedia.org/ . . . , Aug. 28, 2005, 1 page.
Slashdot, Google Patents Its Home Page, Slashdot, Sep. 2, 2009, 5 pages.
"Slashdot FAQ—Comments and Moderation," http://slashdot.org/faq/ . . . Aug. 28, 2005, 20 pages.
Seward, Zachary M. "The first-ever hashtag, @-reply and retweet, as Twitter users invented them". Oct. 15, 2013. 1-4 pgs.
Simtropolis, Is it Possible to Hyperlink Images Using BBCode?, https://community.simtropolis.com/forums/topic/9242-is-it-possible-to-hyperlink-images-using-bbcode/, Mar. 15, 2006, 15 pgs.
Metafilter. Metafilter FAQ. http://faq.metafilter.com/ Accessed May 1, 2017. pp. 1-33.
Scriptygoddess. "How to set up a 'subscribe to comments' feature on your blog (MT specific)". May 5, 2002. pp. 1-12.
Cemper, Christoph C. Drupal: Comment Notify'. Dec. 28, 2016. pp. 1-3.
MetaFilter. "Popular Favorites". Jun. 14, 2006. pp. 1-1.

* cited by examiner

SYSTEMS AND METHODS FOR PRESENTING MESSAGES IN A COMMUNICATIONS SYSTEM

CROSS REFERENCE TO RELATED APPLICATIONS

This application is a continuation of U.S. patent application Ser. No. 14/520,229, filed Oct. 21, 2014, which is a continuation of U.S. patent application Ser. No. 13/676,028, filed Nov. 13, 2012, issued on Oct. 21, 2014 as U.S. Pat. No. 8,868,669, which is a divisional of U.S. patent application Ser. No. 13/038,295, filed Mar. 1, 2011, issued on Nov. 13, 2012 as U.S. Pat. No. 8,312,090, which is a continuation of U.S. patent application Ser. No. 11/728,318, filed Mar. 22, 2007, issued on Mar. 1, 2011 as U.S. Pat. No. 7,899,869, all of which are incorporated by reference herein in their entirety.

This application is related to U.S. Pat. No. 7,865,553, filed Mar. 22, 2007, entitled "Chat System Without Topic-Specific Rooms"; U.S. Pat. No. 7,860,928, filed Mar. 22, 2007, entitled "Voting In Chat System Without Topic-Specific Rooms"; and U.S. Pat. No. 7,904,500, filed Mar. 22, 2007, entitled "Advertising In Chat System Without Topic-Specific Rooms," all of which are hereby incorporated by reference herein in their entirety.

TECHNICAL FIELD

The disclosed embodiments relate generally to chat systems, including but not limited to methods, systems, and user interfaces for relaying messages from various users and sources that are potentially of interest to the user without requiring the user to enter topic-specific chat rooms.

BACKGROUND

Chat system technology, commonly referred to as online chat, allows users to communicate in near-real time over a network, such as the Internet or an intranet. The most common forms of online chat are direct, one-to-one chat, commonly referred to as instant messaging (or "IM"), and chat rooms. A chat room allows multiple users to communicate synchronously within the confines of the chat room.

User interactions in chat room systems include: entering a particular chat room as an active user to type in messages and/or view messages, replying to messages in a chat room, saving messages displayed during a chat session, and switching to a different chat room.

When a user is interested in conversing with other users (participants) in a particular chat room, the user enters the room either as a registered user or as a guest. Each participant in a particular chat room sees a message window for that chat room. Participants' messages appear in the message window in the order that the messages are posted. A user can respond to a recent message by posting a reply in a response dialog box. In a chat client, the newest messages are displayed either at the top or bottom of the message window. A message window will display a pre-determined number of messages. When the maximum number of messages is reached, older messages are scrolled off the message window to make room for newer messages as they are posted.

There are various technologies for implementing chat systems. One common chat technology is referred to as IRC, short for "Internet Relay Chat." IRC is a client-server technology in which users must use a specific IRC client program to select and log in to chat rooms. IRC chat clients and chat server employ the TCP/IP (Internet) protocol for communications. Web-based chat technologies are also available.

In current chat systems, a user can only view or respond to messages that originate from a single topic-specific chat room. Thus, if a user wishes to participate in multiple chat rooms, the user must open multiple sessions to keep track of different chat rooms. Further, the current technology does not provide a convenient way for automatically determining which conversations are likely to be of interest to the user.

BRIEF DESCRIPTION OF THE DRAWINGS

For a better understanding of the aforementioned aspects of the invention as well as additional aspects and embodiments thereof, reference should be made to the Description of Embodiments below, in conjunction with the following drawings in which like reference numerals refer to corresponding parts throughout the figures.

DESCRIPTION OF EMBODIMENTS

Figure 1:
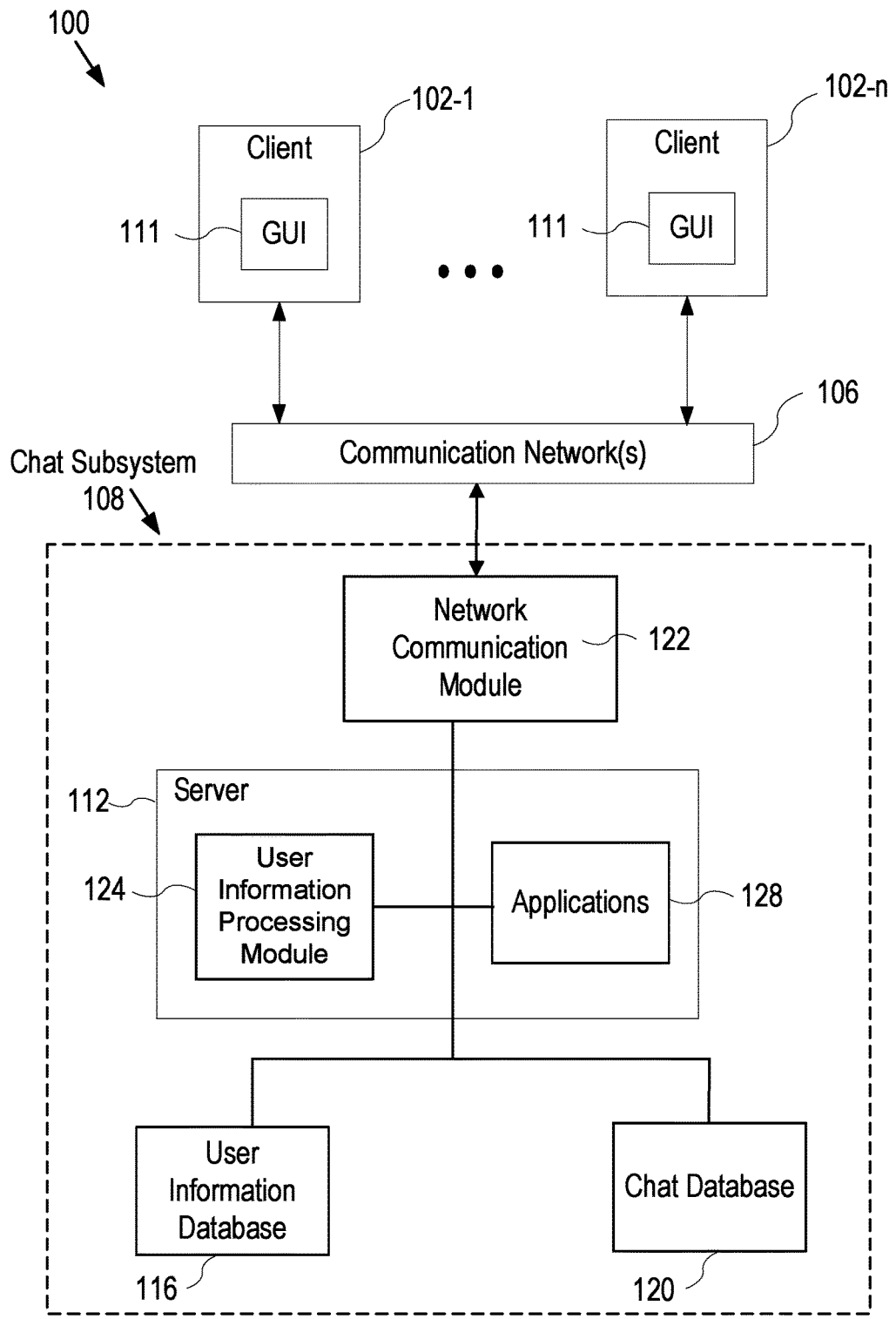
FIG. 1 is a block diagram illustrating an exemplary distributed computer system according to certain embodiments of the invention.

Methods, systems, user interfaces, and other aspects of the invention are described. Reference will be made to certain embodiments of the invention, examples of which are illustrated in the accompanying drawings. While the invention will be described in conjunction with the embodiments, it will be understood that it is not intended to limit the invention to these particular embodiments alone. On the contrary, the invention is intended to cover alternatives, modifications and equivalents that are within the spirit and scope of the invention. The specification and drawings are, accordingly, to be regarded in an illustrative rather than a restrictive sense.

Moreover, in the following description, numerous specific details are set forth to provide a thorough understanding of the present invention. However, it will be apparent to one of ordinary skill in the art that the invention may be practiced without these particular details. In other instances, methods, procedures, components, and networks that are well known to those of ordinary skill in the art are not described in detail to avoid obscuring aspects of the present invention.

According to certain embodiments of the invention, a user in a chat system need not enter topic-specific chat rooms to view and reply to messages that are of interest to the user. Instead, the user specifies the types of messages that the user is interested in receiving. The chat system then sends messages based on the specified types. In addition, the chat system may send, to the user, messages that are popular or that are similar to messages that the user has received. The chat system may send advertisements to the user. Some of the advertisements may be based on the types of messages that the user receives or is interested in receiving. Further, the chat system enables the user: 1) to track one or more message threads, and 2) to give feedback on messages using a feedback GUI that is provided by the chat system.

According to one feature of certain embodiments, messages from real-time message streams are selected and filtered to obtain target messages for a given user. The system provides the user with a mechanism for specifying selection and filtering criteria that the system can use when selecting and filtering the real-time message streams to obtain the target messages for sending to the particular user. According to another feature of an embodiment, the user can specify selection criteria using a focus specification that can be modified by the user at any time. The system also provides the user with user controls for controlling filters that are used by the system to filter messages to obtain target messages to send to the user. According to yet another feature of certain embodiments, the system creates a first inverted index based on the focus specifications of the plurality of users in the chat system. The system also creates a second inverted index based on words recently entered in the chat system by the plurality of users. As part of the message selection process, the incoming real-time message streams are matched against at least one of the inverted indexes.

According to some embodiments, a respective user of the chat system can provide feedback data with respect to target messages that the respective user receives. The chat system evaluates feedback data from the respective users to identify popular messages. The chat system processes the feedback data provided by the respective users to provide feedback results to at least some of the respective authors and to at least some of the respective users who receive popular messages. According to some embodiments, at least a portion of the popular messages is sent to a set of users that have not previously received the popular messages.

According to certain embodiments, the chat system identifies one or more advertisements based in part on the respective focus specification of the respective user and sends the identified advertisements to the respective user.

FIG. 1 is a block diagram illustrating an exemplary distributed computer system 100, according to certain embodiments of the invention. In FIG. 1, system 100 may include one or more client computers 102, a communications network 106 and a chat subsystem 108. Client computers 102 can be any of a number of computing devices (e.g., Internet kiosk, personal digital assistant, cell phone, gaming device, desktop computer, laptop computer, handheld computer, or combinations thereof) used to enable the activities described below. Client computer(s) 102 is also referred to herein as client(s). Client 102 includes a graphical user interface (GUI) 111. One embodiment of client 102 is described in greater detail herein with reference to FIG. 3. Client 102 is connected to chat subsystem 108 via communications network 106. Chat subsystem 108 includes one or more servers, such as server 112, connected to the communications network 106 via network communication module 122. Chat subsystem 108 may also include user information database 116, chat database 120.

Server 112 includes user processing module 124, and applications 128. The network communications module 122 connects server 112 to the communication network 106 and enables the receipt of communications from the communication network 106 and the provision of communications to the communication network 106 bound for client 102 or other destinations. Server 112 communicates with databases such as user information databases 116, and chat database 120 via network communication module 122. For example, the user may send registration information, such as a username and password, to server 112, via communications network 122. Optionally, server 112 receives and verifies the login information, thereby enabling server 112 to associate subsequent data received from client 102 with a particular user record in user information database 116. As another example, user information processing module 124 may be used to verify login information and associate chat messages entered by the user with the user's data record in user information database 116 and/or in chat database 120. In some embodiments, the user may be identified using a cookie stored on the client 102, or by a user identifier that is stored by and associated with a browser toolbar or browser extension. One embodiment of server 112 is described in greater detail herein with reference to FIG. 2.

In the case of multiple servers, each server, such as server 112, is coupled to a communications network 106 via a network communication module 122. The communications network 106 may be the Internet, but may also be any local area network (LAN) and/or wide area network (WAN). In some embodiments, server 112 is a Web server that manages chat messages using appropriate chat protocols. Alternatively, if server 112 is used within an intranet, it may be an intranet server.

Applications 128 include application programs used for creating and updating inverted indexes associated with the process of selecting messages, application programs for selecting and filtering messages from the real-time message streams to obtain target messages for the respective users, and/or application programs for managing the rate of sending target messages to the respective users in the chat system. Applications 128 are described in greater detail herein with reference to FIG. 2. The user information processing module 124 assists in accessing, updating and modifying the user information database 116. The user information database 116 stores various information associated with the user including information related to chat messages created by the user as described in greater detail herein in reference to FIG. 2.

Chat database 120 stores information on chat messages and may store global information of chat subsystem 108 such as system default functions and default values. Chat database 120 is described in greater detail herein with reference to see FIG. 2.

In essence, server 112 is configured to manage certain aspects of chat subsystem 108, including receiving requests from the user (associated with client 102), sending chat messages to clients 102 for display and receiving information, such as messages, user registration information and user preferences from clients 102.

In some embodiments, fewer and/or additional modules, functions or databases are included in chat subsystem 108 and server 112. The modules shown in chat subsystem 108 and server 112 represent functions performed in a certain embodiments.

Notwithstanding the discrete blocks in FIG. 1, the figure is intended to be a functional description of some embodiments of the invention rather than a structural description of functional elements in the embodiments. One of ordinary skill in the art will recognize that an actual implementation might have the functional elements grouped or split among various components. For example, user information database 116 may be part of server 112. In some embodiments, user information database 116 may be implemented using one or more servers whose primary function is to store and process user information. Similarly, chat database 120 may be implemented on one or more servers. Moreover, one or more of the blocks in FIG. 1 may be implemented on one or more servers designed to provide the described functionality. Although the description herein refers to certain features implemented in client 102 and certain features implemented in server 112, the embodiments of the invention are not limited to such distinctions. For example, features described herein as being part of server 112 could be implemented in whole or in part in client 102, and vice versa.

Figure 2:
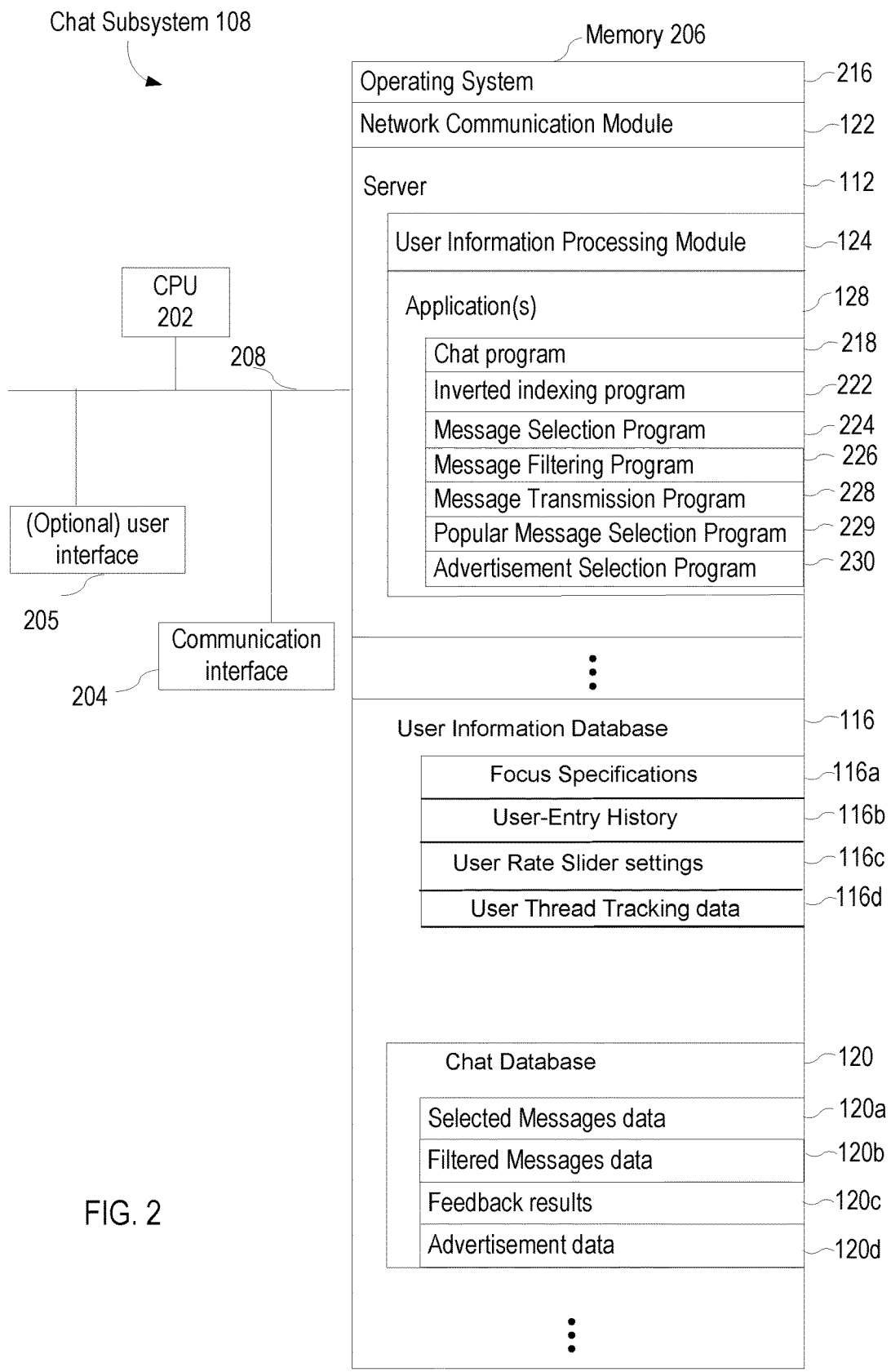
FIG. 2 is a block diagram illustrating a chat subsystem, according to certain embodiments of the invention.

FIG. 2 is a block diagram illustrating chat subsystem 108, according to certain embodiments of the invention. Chat subsystem 108 includes one or more processing units (CPU's) 202, an optional user interface 205, one or more network or other communications interfaces 204, memory 206, and one or more communication buses 208 for interconnecting these components. The communication buses 208 may include circuitry (sometimes called a chipset) that interconnects and controls communications between system components.

Memory 206 may include high speed random access memory and may also include non-volatile memory, such as one or more magnetic or optical disk storage devices. Memory 206 may optionally include one or more storage devices remotely located from the CPU(s) 202. In some embodiments, memory 206 stores the following programs, modules and data structures, or a subset or superset thereof:

an operating system 216 that includes procedures for handling various basic system services and for performing hardware dependent tasks;

a network communication module (or instructions) 122 that is used for connecting chat subsystem 108 to other computers (e.g., clients 102) via one or more communication network interfaces 204 (wired or wireless) and one or more communication networks, such as the Internet, other wide area networks, local area networks, metropolitan area networks, and so on;

a server 112 for managing certain aspects of chat subsystem 108;

a user information database 116 for storing information associated with the users, such as focus specifications 116a, user-entry history 116b, user rate slider settings 116c, and user thread tracking data 116d. Focus specifications 116a, user-entry history 116b, user rate slider settings 116c, and user thread tracking data 116d are described in greater detail herein with reference to FIG. 4 and FIG. 5; and a chat database 120 for storing information related to chat messages such as selected messages data 120a, filtered message data 120b, feedback results 120c, and advertisement data 120d.

Selected messages data 120a includes messages selected based on respective focus specifications for respective users. Filtered message data 120b includes filtered (target) messages for the respective users. Feedback results 120c include processed feedback data from users regarding the chat messages, and advertisement data 120d includes advertisements that are selected for respective users.

In some embodiments, server 112 includes the following non-limiting examples of elements, or a subset of such elements: a user information processing module 124, and an applications module 128 that includes application programs, such as a chat application program 218, an inverted indexing application program 222, a message selection application program 224 for assigning messages to the respective users, a message filtering application program 226 for obtaining target messages, a message transmission application program 228 for sending target messages to the user at an appropriate rate, a popular message selection application program 229 for selecting popular messages for sending to the user, and an advertisement selection application program 230 for selecting advertisements for sending to the user. According to certain embodiments, two or more of above application programs may be combined. As a non-limiting example, the functions of the above application programs may be performed by chat application program 218. According to some embodiments, server 112 uses chat application program 218 to manage various aspects of the chat subsystem such as coordinating the functions of the inverted indexing application program 222, the message selection application program 224, the filtering application program 226, the message transmission application program 228, user information database 116 and chat database 120. The functions of such application programs and the chat database 120 are described in greater detail herein with reference to FIG. 6, FIG. 7, FIG. 8 and FIG. 9. User information processing module 124 may be used for accessing and modifying user information database 116. In some embodiments, server 112 and/or the databases 116 and 120 may include additional modules.

Figure 3:
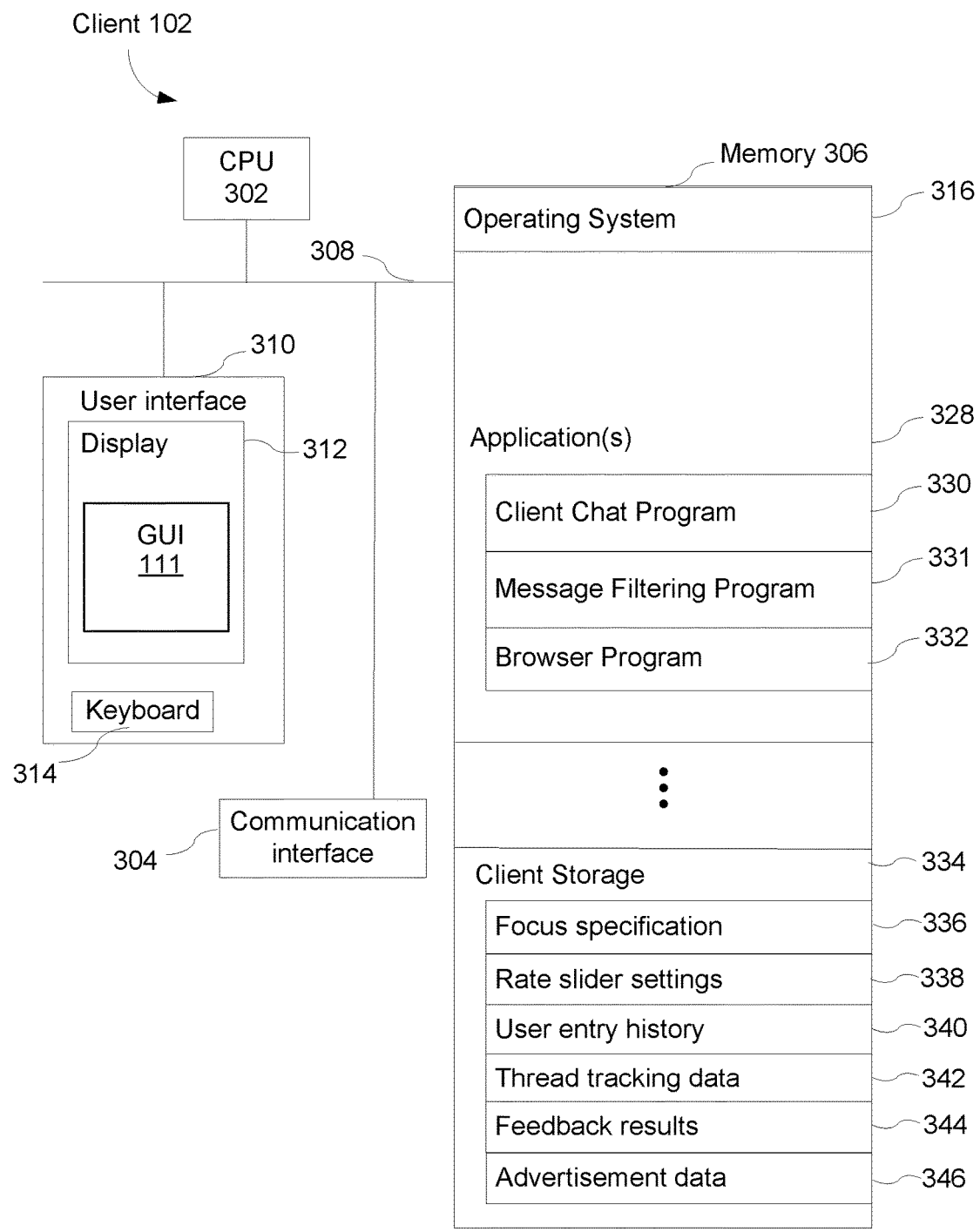
FIG. 3 is a block diagram illustrating a client, according to certain embodiments of the invention.

FIG. 3 is a block diagram illustrating client 102, according to certain embodiments of the invention. Client 102 includes one or more processing units (CPUs) 302, one or more network or other communications interfaces 304, memory 306, and one or more communication buses 308 for interconnecting these components. Client 102 may include a user interface 310, for instance a display 312 with GUI 111 and a keyboard 314. Memory 306 may include high speed random access memory and may also include non-volatile memory, such as one or more magnetic or optical storage disks. Memory 306 may include mass storage that is remotely located from CPUs 302. Memory 306 may store the following elements, or a subset or superset of such elements:

An operating system 316 that includes procedures for handling various basic system services and for performing hardware dependent tasks;

Client applications 328 such as a client chat application program 330, message filtering program 331, and a browser application program 332. The function of client chat application 330 is described in greater detail herein with reference to FIG. 6 and FIG. 7. The message filtering program 331 is described in greater detail herein with reference to FIG. 5; and Client storage 334 for storing data, including focus specification 336 associated with the particular user, rate slider settings 338 selected by the particular user, user-entry history 340 specific to the particular user, thread tracking data 342 associated with message threads that are tracked by the particular user, feedback results 344 for the particular user, and advertisement data 346 associated with the particular user. The data in client storage 334 is periodically pushed to or pulled by the server 112 to update the server's databases.

The above identified modules and applications in FIG. 2 and FIG. 3 correspond to a set of instructions for performing a function described above. These modules (i.e., sets of instructions) need not be implemented as separate software programs, procedures or modules, and thus various subsets of these modules may be combined or otherwise re-arranged in various embodiments. In some embodiments, memories 206 and 306 may store a subset of the modules and data structures identified above. Furthermore, memories 206 and 306 may store additional modules and data structures not described above.

Although FIG. 2 and FIG. 3 show chat subsystem 108 and client 102 as a number of discrete items, FIG. 2 and FIG. 3 are intended more as a functional description of the various features which may be present in chat subsystem 108 and client 102 rather than as a structural schematic of the embodiments described herein. In practice, and as recognized by those of ordinary skill in the art, items shown separately could be combined and some items could be separated. For example, some items shown separately in FIG. 2 could be implemented on single servers and single items could be implemented by one or more servers. As another example, some of the databases shown in either of the figures may be combined while other databases may be separated into more granular components. The actual number of servers in chat subsystem 108 and how features are allocated among them may vary from implementation to implementation, and may depend in part on the amount of data traffic that the system handles during peak usage periods as well as during average usage periods.

Figure 4:
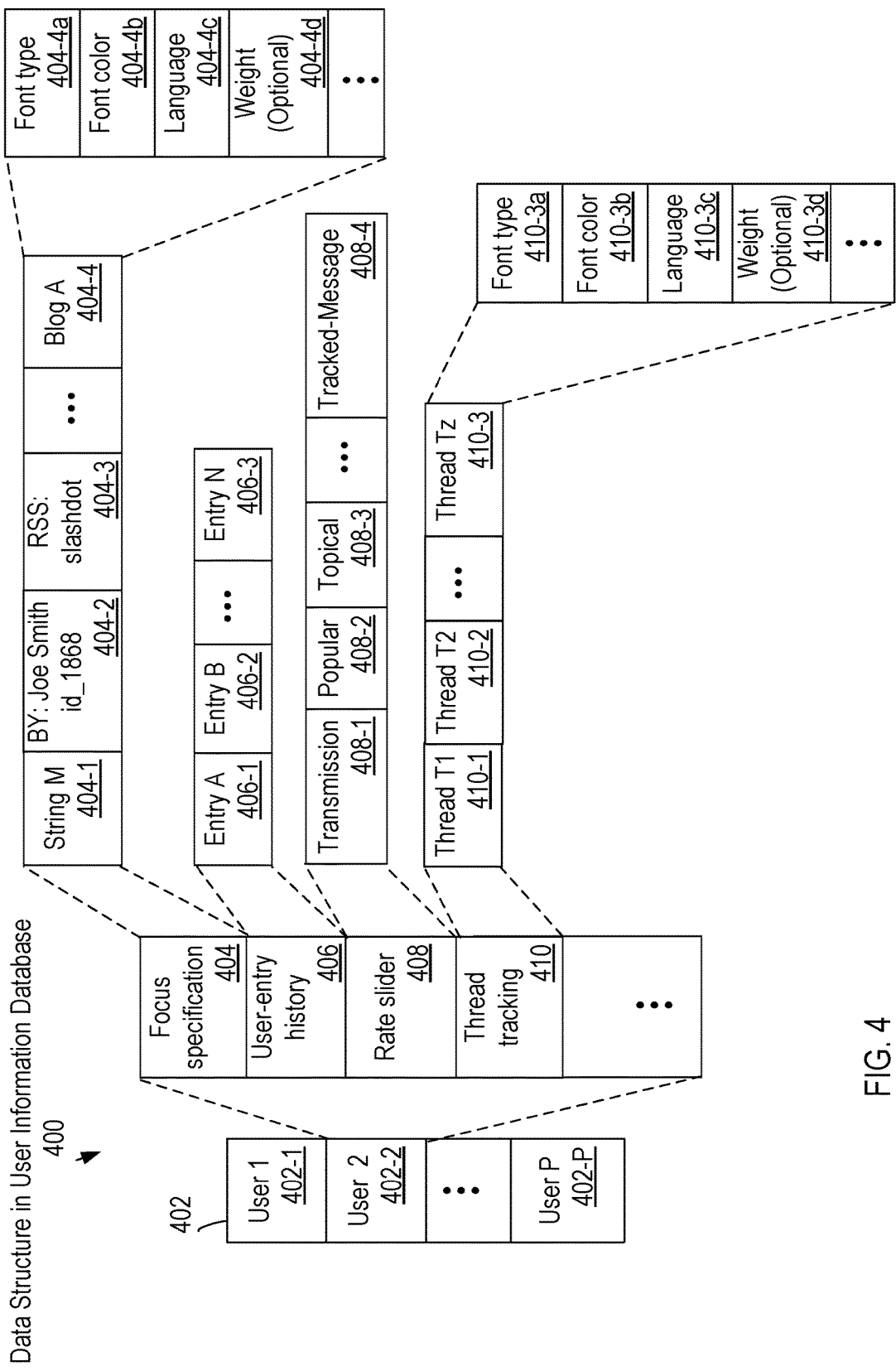
FIG. 4 is a block diagram that illustrates a data structure 400 in a user information database such as user information database 116 of FIG. 2, according to some embodiments.

According to certain embodiments, a respective user is associated with a focus specification, such as focus specification 404 of FIG. 4. The plurality of focus specifications may be stored as focus specifications 116a in user information database 116, for example. The user can use his or her focus specification to specify selection criteria for selecting messages from the real-time message streams that are of interest to the user. The selected messages are assigned to the respective user. Assigning messages to a user means that an association is created between the selected message and the user. However, once a message is assigned to a user does not mean that the assigned message is automatically sent to the user. The messages that are assigned to a user are filtered using filtering criteria (rate slider data 408 of FIG. 4) that are controlled by the user to obtain target messages. At least a portion of the target messages are then displayed to the user. Whether or not all the target messages are displayed to the user depends on the volume of target messages and the transmission rate for sending the target messages to the user and/or the rate of display of the target messages.

According to certain embodiments, the user can specify topics of interest in the focus specification by specifying key words, natural language expressions (such as string 404-1 of FIG. 4), computer language expressions, Boolean operators, etc., for example. The system may support specialized pattern matching language to enable users to specify selection criteria in the form of high-precision constructs, for example.

FIG. 4 is a block diagram that illustrates a data structure 400 in user information database such as user information database 116 of FIG. 2, according to some embodiments. Data structure 400 includes user data 402 corresponding to the plurality of users such as User 1, User 2, . . . , and User P of the chat system. For example, for a specified user such as User 2, user data 402-2 includes focus specification data 404, user entry history 406, rate slider data 408, and thread tracking data 410. Focus specification data 404 includes user specified selection criteria such as strings 404-1, user specified identification of authors 404-2, user specified feeds 404-3, and user specified blogs 404-4, etc. According to certain embodiments, each of the user specified selection may be associated with a set of attributes. For example, the user specified selection criterion 404-4 is associated with a set of attributes such as font type 404-4a, font color 404-4b, and language 404-4c. Optionally, the user specified criterion may also be associated with a weight 404-4d for use in a weighting function for obtaining target messages for the specified user. Focus specifications are used to create an inverted index as described in greater detail below. User entry history 406 includes words recently entered by User 2 such as Entry A 406-1, Entry B 406-2, . . . , Entry N 406-3, etc. User entry history such as user entry history 406 is used for creating another inverted index as described in greater detail below. Rate slider data 408 includes user specified transmission rate slider setting 408-1, user specified popular slider setting 408-2, user specified topical slider setting 408-3, and user specified tracked message slider setting 408-4. For example, the user may move the sliders provided by the chat system GUI, such as those shown on FIG. 12, to desired levels. User specified slider settings are used as weighting functions for obtaining target messages as described in greater detail below. Thread tracking data 410 includes message threads that are tracked by a specific user such as User 2. For example, the tracked threads may be Thread T1 410-1, Thread T2 410-2, . . . Thread TZ 410-3, etc. Each tracked thread may be associated with a set of attributes. As a non-limiting example, Thread TZ 410-3 is associated with a set of attributes such as font type 410-3a, font color 410-3b, and language 410-3c. Optionally, the specified tracked thread may also be associated with a weight 410-3d for use in obtaining target messages for the specified user. Tracked threads are described in greater detail below.

The focus specification may be in the form of a file or data structure that can be modified by the user at any time. As another non-limiting example, the focus specification may be presented in a window display for modification by the user. The user can edit the text in the focus specification window. The focus specification can optionally include display attributes associated with the respective user-specified selection criteria. Display attributes may include font type (font type 404-4a), font size, font color (font color 404-4b), style, indentation depth, language (language 404-4c), etc. To illustrate, assume that the user specifies "pottery" as one of the selection criteria in the focus specification. Further assume that the user has selected italicized Ariel font in green, and the "English" language as the display attributes associated with the selection criterion, "pottery." In the event that a target message regarding pottery is displayed to the user, such a message is displayed in English and in green italicized Ariel font. Thus, at a glance, the user can visually identify "pottery" related target messages easily when the target messages are scrolling past in the message display window. In other words, the user can specify display attributes as visual aids by associating a topic of interest with a set of user-specified display attributes.

Further, the user can specify sources of real-time information that are of interest to the user in the user's focus specification. For example, the user may specify a source as "messages by authors X, Y and Z" (identification of authors 404-2). Also, the user can specify real-time information sources such as news feeds, RSS feeds (RSS 404-3), blogs (Blog 404-4), stock ticker data, TV close caption streams, etc. According to one embodiment, such real-time information sources are integrated into the chat system by creating pseudo users to represent such real-time information sources.

Also, the user can use the focus specification to exclude specific sources of real-time information. In other words, real-time information streams from the excluded sources are not matched against the user's selection criteria.

In order to match incoming real-time information streams against the users' focus specifications, the system creates an inverted index based on focus specifications of the users in the chat system and by using inverted indexing program 222, according to certain embodiments. Such an inverted index is herein referred to as a focus specification index. The keys of the focus specification index are the user-specified words/expressions, user-specified channels (news feeds, blogs, RSS feeds, etc.), and the user id of the user that originated the user-specified words/expressions, etc. The focus specification index is periodically updated to reflect modifications made by users to their respective focus specifications. Message selection program 224 can use matching functions to match the words that appear in an incoming real-time information stream against the focus specification index. Such an incoming stream is assigned to those users for whom there is a match. The matching functions may include an appropriate time-dependent decay function. If a user neglects to specify any selection criteria in the user's focus specification, the system provides default selection criteria for selecting messages for assigning to the user. For example, default selection criteria may be stored in chat database 120.

Optionally, the system may use inverted indexing program 222 to create a second inverted index based on words recently entered by the respective users. User-entry history data 116*b* stores words recently entered by the respective users. For example, as shown in FIG. 4, user-entry history 406 stores recently entered words such as Entries 406-1, 406-2, ... 406-3, etc., associated with a particular user. Such an inverted index can be periodically updated and is herein referred to as a "recent-entry" index. As previously explained, message selection program 224 can use matching functions to match the words that appear in an incoming real-time information stream against both the focus specification index and the recent-entry index.

Figure 12:
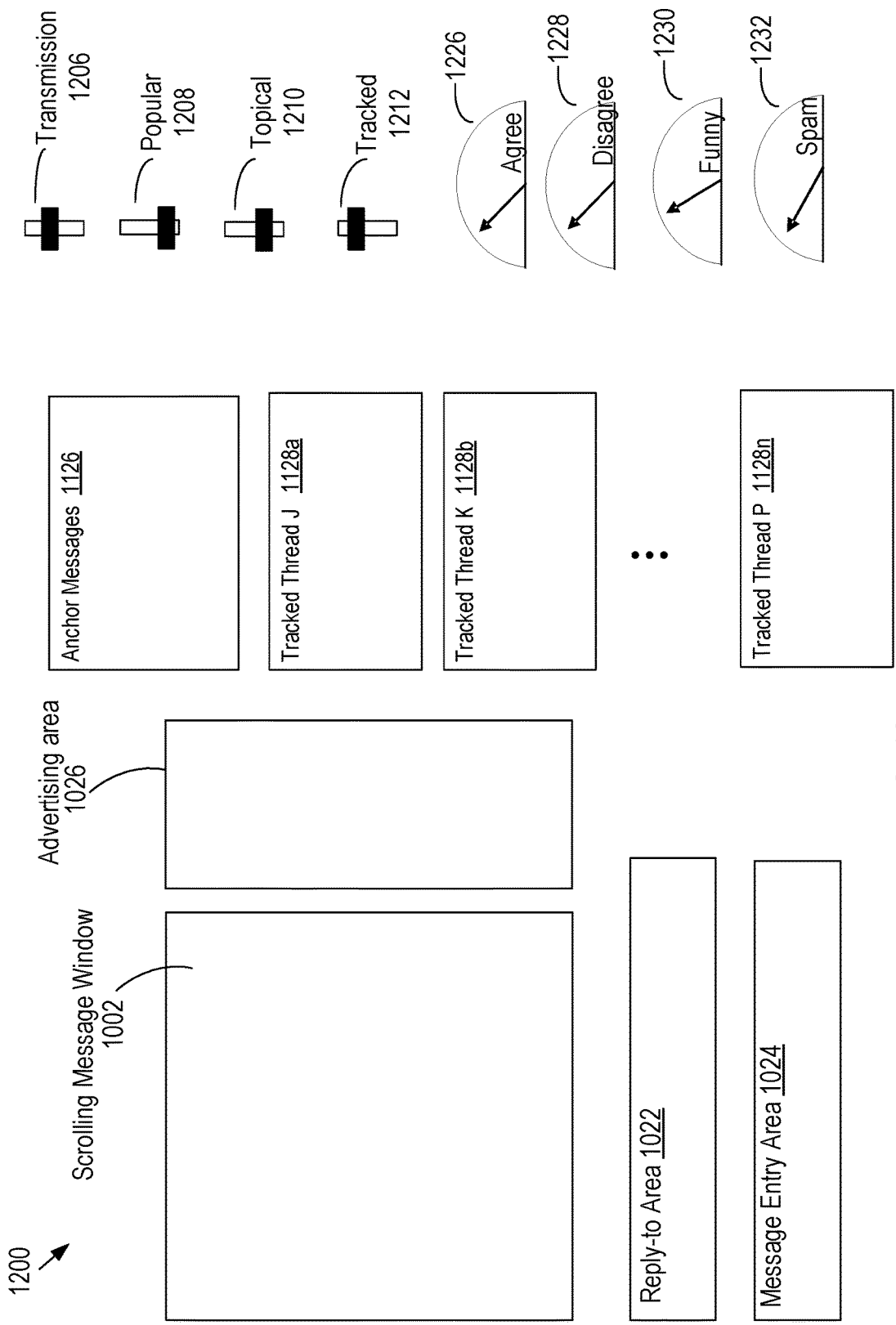
FIG. 12 is another alternate schematic illustration of a chat GUI for displaying target messages to the user, according to certain embodiments of the invention.

User rate slider data 116*c* stores settings specified by the respective user for filtering criteria or filters. Non-limiting examples of filters include: 1) a transmission rate slider, 2) a popular slider, 3) a topical slider, and 4) a tracked-message slider. Such filter settings may be stored as transmission rate slider setting 408-1, user specified popular slider setting 408-2, user specified topical slider setting 408-3, and user specified tracked message slider setting 408-4 as shown in FIG. 4. According to certain embodiments, the user can use the popular slider, topical slider, and tracked slider to control the mixing ratios of popular, topical and tracked target messages, respectively, that are sent to the user. According to certain embodiments, the user-specified settings of the respective sliders correspond to weights in appropriate weighting functions that are used for scoring a user's assigned messages to obtain target messages. As the volume of incoming real-time message streams increases, there may be more assigned messages than a user can view in a practical fashion. Thus, the system uses one or more user-specified filters to select high scoring assigned messages for sending as target messages to the user at a reasonable rate. The user can control the rate that messages are sent using the message transmission rate slider. The user can use the popular slider to control the mixing ratios of messages to include some "popular" messages sent to the user. Similarly, the user can use the topical slider and tracked-message slider, for adjusting the mixing ratios of different types of messages sent to the user. Such sliders are illustrated in FIG. 12 herein.

User thread-tracking data 116*d* stores tracking information associated with the threads that are tracked by the respective user. For example, as shown in FIG. 4, the tracking information identifies the specific threads such as threads 410-1, 410-2, ... 410-3, etc., tracked by a particular user. The tracking information can be used to select messages from the tracked thread for assigning to the user and/or for controlling one or more thread-tracking features such as display attributes and the display of anchor messages, as described in greater detail herein with reference to FIG. 10 and FIG. 11. An anchor message is the first message of a tracked thread that the user has indicated interest in. To illustrate, if a user decides to begin tracking the thread at message X, then message X becomes the anchor message for the thread of subsequent messages that follow.

In some embodiments, users can explicitly deselect branches of a thread tree that do not interest them, and the system can automatically prune subtrees of the thread tree that do not receive attention in the form of comments of further selections as containing interesting messages or that receive deselection actions from a plurality of other users. This propagates the more interesting branches of the thread tree and keeps the thread tree to a manageable size.

Figure 5:
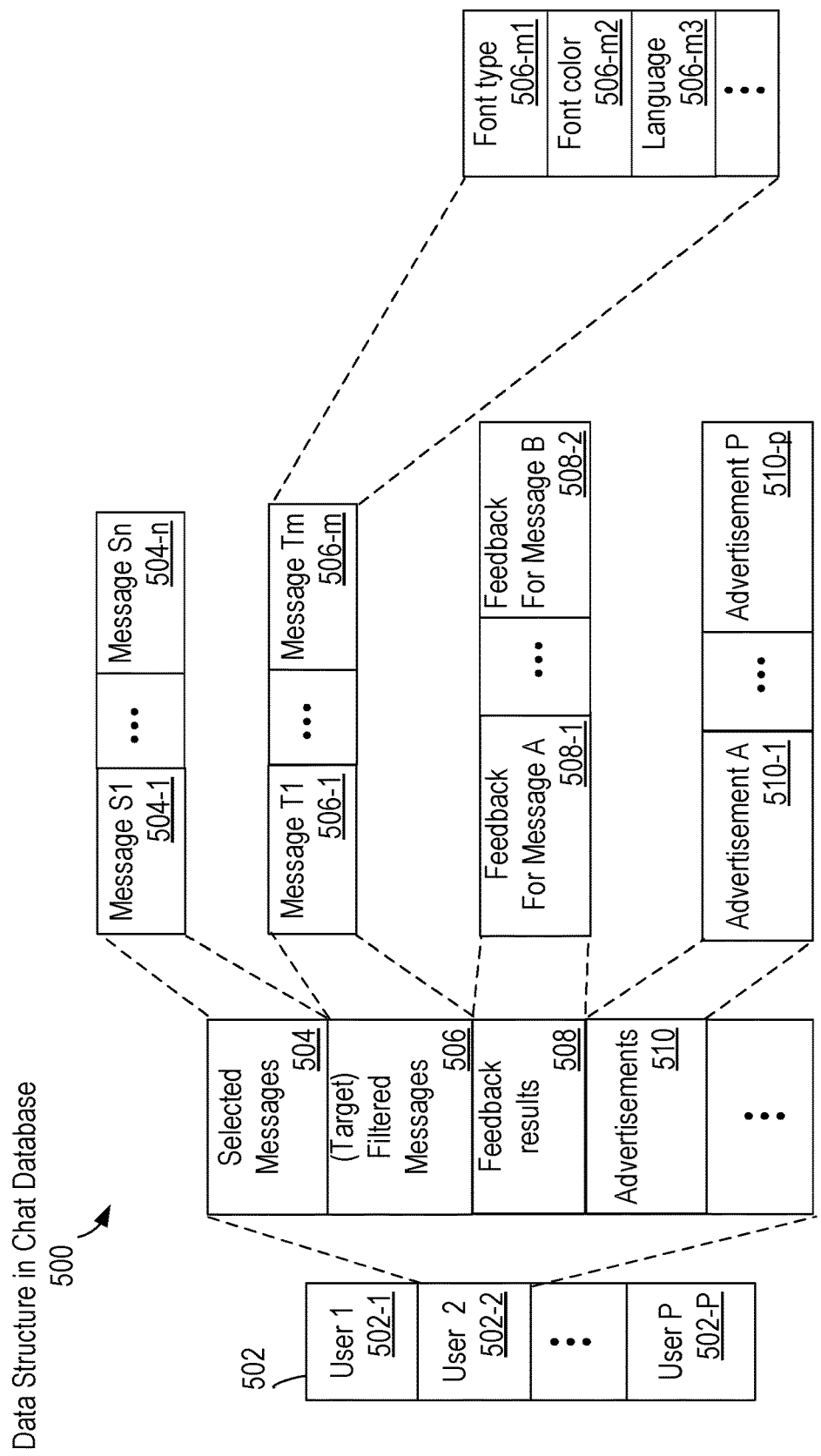
FIG. 5 is a block diagram that illustrates a data structure in a chat database such as chat database, according to some embodiments.

FIG. 5 is a block diagram that illustrates a data structure 500 in a chat database such as chat database 120 of FIG. 2, according to some embodiments. Data structure 500 includes user chat data 502 corresponding to the plurality of users such as User 1, User 2, . . . , User P of the chat system. For example, for a specified user such as User 2, user chat data 502-2 includes selected messages 504, target (filtered) messages 506, feedback results 508, and advertisements 510. Selected messages 504, target (filtered) messages 506, and advertisements 510 may be associated with display attributes. For example, Message Tm 506-*m* has attributes such as font type 506-*m*1, font color 506-*m*2, language 506-*m*3, etc. For purposes of simplicity the display attributes of selected messages and advertisements are not shown in data structure 500.

As described above, selected messages are messages selected based on the selection criteria specified in the respective focus specification for a specified user. The selected messages are associated with the specified user. For example, selected messages such as Message S1 504-1, . . . , Message Sn 504-*n*, etc., are assigned to User 2. The selected messages for User 2 are filtered using filtering criteria (rate slider data 408) to obtain target or filtered messages. For example, selected messages 504 are filtered using filtering criteria based on rate slider data 408 to obtain target messages such as Message T1 506-1, . . . , Message Tm 506-m, etc., for User 2. Feedback results 508 include the feedback received with respect to respective messages authored by User 2. For example, User 2 may receive feedback such as Feedback 508-1 for message A, . . . , Feedback 508-2 for Message B, etc. Further, the chat system may send advertisements such as advertisement A 510-1 . . . , Advertisement P 510-p, etc., to User 2.

In other words, the chat system may assign messages to a respective user based on one or more reasons including: 1) the message is an advertisement that the system would like to send to the user, 2) the message belongs to a thread that is explicitly tracked by the respective user, 3) the message is a popular message in the chat system (for example, the message is tracked by many users), and 4) the message matches at least one selection criterion in the respective user's focus specification. According to certain embodiments, the weight of the above reasons 2 to 4 are additive with respect to filtering selected messages to obtain target messages to send to the respective user.

Figure 6:
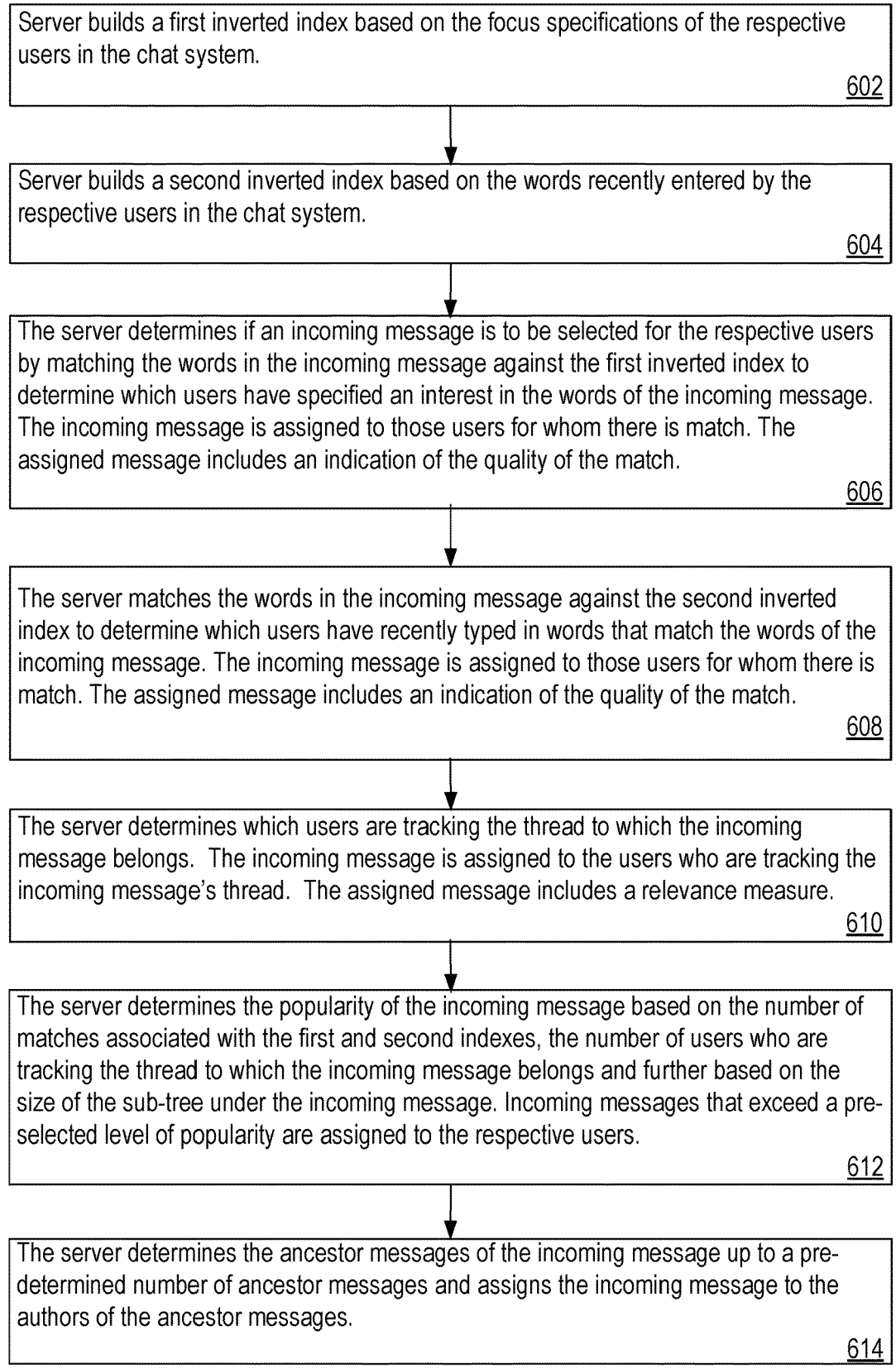
FIG. 6 is a high-level flowchart representing some of the steps for selecting messages of interest for the respective users in the chat system, according to certain embodiments of the invention.

FIG. 6 is a high-level flowchart representing some of the steps for selecting messages to be assigned to a respective user, according to certain embodiments. It will be appreciated by those of ordinary skill in the art that one or more of the acts described may be performed by hardware, software, or a combination thereof, as may be embodied in one or more computing systems. FIG. 6 is described with reference to FIG. 2 and FIG. 4. The server builds a first inverted index (focus specification index) based on the focus specifications of the plurality of users participating in the chat system (602). For example, server 112 of FIG. 2 uses inverted indexing program 222 to build the focus specification index based on the plurality of focus specifications stored in focus specifications database 116a. The focus specification index may be updated as frequently as needed to reflect modifications, if any, made by respective users and such that, on average, the messages selected for assignment are of current interest to the respective user. For example, the system can save "before modification" and "after modification" copies of the respective user's focus specification. The system can generate a list of differences based on the "before modification" and "after modification" copies. The system can then delete or add entries to the inverted index based on the generated list of differences. Updates to user-specified channels (news feeds, blogs, RSS feeds, etc.) may result in updating associated data structures. For example, data structures that include lists of users that would like to see "blog A" (404-4) channel messages is updated if a user made a recent modification in his focus specification to include "blog A."

Returning to FIG. 6, the server builds a second inverted index (recent-entry index) based on words recently entered by the respective users (604). For example, server 112 of FIG. 2 uses inverted indexing program 222 to build the recent-entry index based on the recently entered words stored in user-entry history 406. The recent-entry index may be updated as frequently as needed to reflect currently entered words.

A message from the incoming real-time message streams is herein referred to as an incoming message. According to certain embodiments, the chat system attaches to an incoming message one or more of the following: 1) a time stamp, 2) information on source language, 3) a link to the parent message if the incoming message is a reply to another message, 4) a unique identifier for identifying the message, and 5) the identity of the author.

The server determines if an incoming message is to be selected for assignment to the respective users by matching the words in the incoming message against the focus specification index to determine which users have specified an interest in the words of the incoming message (606). For example, server 112 uses message selection program 224 to determine if an incoming message is to be selected for assignment to the respective users. The incoming message is assigned to those users for whom there is a match. The assigned message includes an indication of the quality of the match. For example, the selected message can include annotations of the reasons for selecting the message. The annotations can include the number of matching words, how unusual were the matching words. The more unusual the words, the greater the weight.

According to certain embodiments, server 112 uses message selection program 224 to match the words in the incoming message against the recent-entry index (608). The incoming message is assigned to those users for whom there is a match. The assigned message includes an indication of the quality of the match.

The server 112 uses message selection program 224 to determine which users are tracking the thread to which the incoming message belongs (610). The incoming message is assigned to those users who are tracking the thread to which the incoming message belongs. The assigned message includes a relevance measure. As a non-limiting example, the relevance measure can include the distance between the node of the anchor message and the node of the incoming message. Such a distance is also referred to herein as a thread length.

The server 112 uses message selection program 224 to determine the popularity of the incoming message (612). For example, one measure of popularity may be determined by the number of matches the incoming message had when matched against the focus specification index and the recent-entry index. Another measure of popularity may be determined by the number of users that are tracking the thread to which the incoming message belongs. The popularity of the incoming message may also be determined by measuring the size of the sub-tree under the incoming message. Incoming messages that exceed a pre-selected level of popularity are assigned to the respective users.

The server 112 uses message selection program 224 to determine the ancestor messages of the incoming message up to a pre-determined number of ancestor messages and assigns the incoming message to the authors of the ancestor messages (614).

It will be appreciated by those skilled in the art that some of the above acts described with reference to FIG. 6 need not be performed in the order described. For example, the acts of matching the incoming message against the focus specification index and the recent-entry index as well as the act of determining which users are tracking the thread of the incoming message may be done concurrently using a distributed process. In certain embodiments, the system is designed to be "best-effort", i.e., it provides no guarantees that any message will reach any user, which enables the implementers to exploit considerable freedoms when distributing the system components among many computers.

As described above with reference to FIG. 6, as the real-time incoming messages stream into the chat system, various selection operations are performed on the incoming message to assign the message to one or more respective users. According to certain embodiments, the system can perform filtering operations, described in greater detail with reference to FIG. 7, as the incoming message is assigned to the respective user. According to other embodiments, a time slice approach is used for the filtering operations. For example, assume that the time slice is selected to be Δt seconds. Rather than filtering an incoming message as soon as it is assigned to a user, the filtering operations are performed once every Δt seconds. Thus, the filtering operations are performed on a bundle of assigned messages at a time for the respective user. The size of the time slice may be pre-selected or dynamically selected based on the system load. The more loaded the system, the larger the time slice, for example.

According to one embodiment, the system can send the assigned messages to client 102 and allow client 102 to perform the filtering operations on the bundle of assigned messages. In other words, client 102 uses message filtering application program 331 to filter the bundle of assigned messages to obtain target messages for displaying to the respective user associated with client 102.

According to certain other embodiments, server 112 performs the filtering operations by using message filtering application program 226 to obtain target messages. For purposes of explanation, FIG. 7 is described by assuming that server 112 performs the filtering operations.

Figure 7:
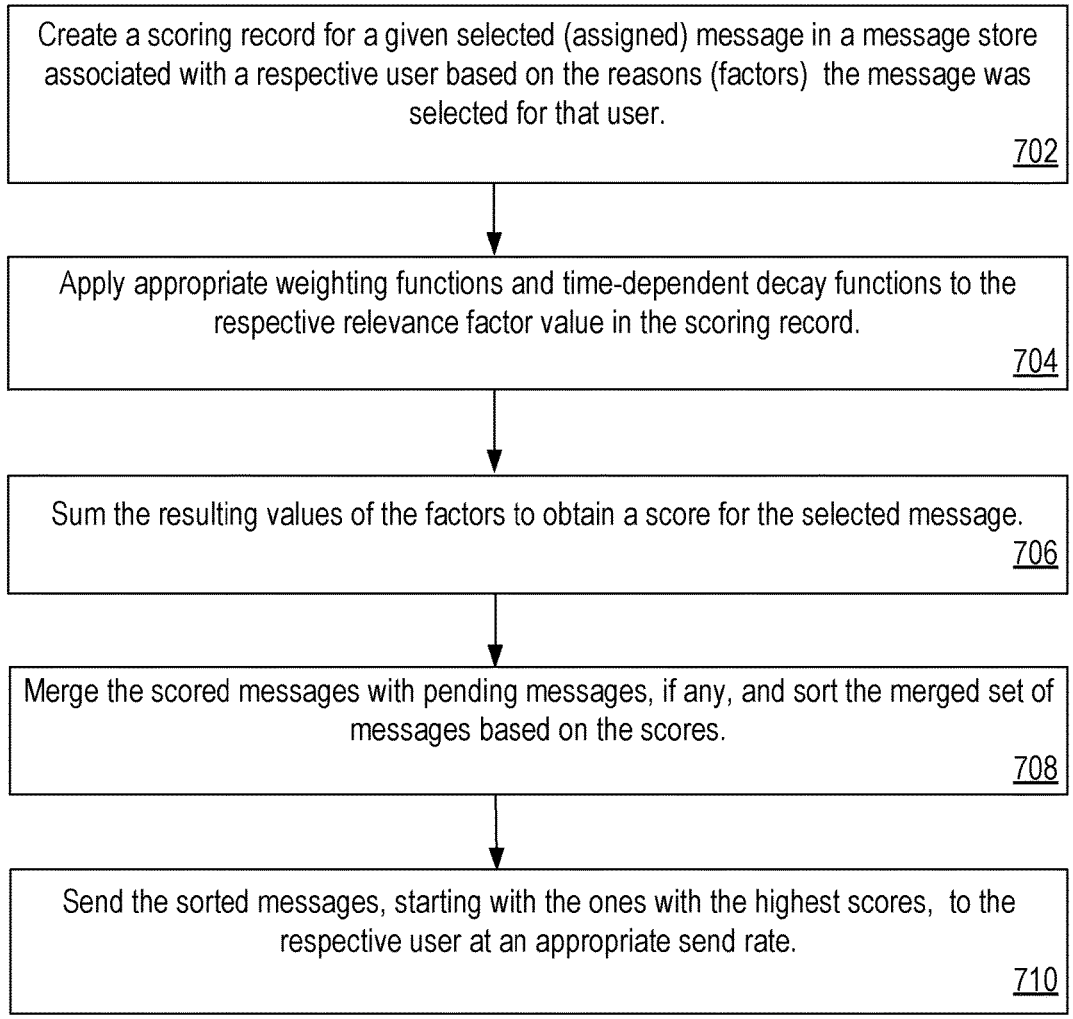
FIG. 7 is a high-level flowchart representing some of the steps for filtering messages to obtain target messages for sending to the respective users in the chat system, according to certain embodiments of the invention.

FIG. 7 is a high-level flowchart representing some of the steps for filtering the selected messages for the respective users in the chat system, according to certain embodiments of the invention. It will be appreciated by those of ordinary skill in the art that one or more of the acts described may be performed by hardware, software, or a combination thereof, as may be embodied in one or more computing systems. FIG. 7 is described with reference to FIG. 2 and FIG. 5.

Server 112 uses either the chat application program 218 and/or the message filtering application program 226 of FIG. 2 to create a scoring record for a given assigned message (702). According to certain embodiments, the scoring record associated with an assigned message includes annotations of the reasons for selecting the message and/or other relevance measures for selecting the message. The reasons and relevance measures for selecting a message is herein also referred to as relevance factors. Each relevance factor is associated with a value.

Server 112 uses the message filtering application program 226 to apply appropriate weighting functions to the relevance factors in the scoring record associated with the respective assigned message (704). As a non-limiting example, for a given message, the respective relevance factor value can be multiplied by appropriate normalizing factors and then multiplied by the user-specified settings of appropriate filters such as the transmission rate slider, popular slider, topical slider, and the tracked-message slider. According to certain embodiments, appropriate time-dependent decay functions may be applied to one or more of the relevance factor values to discount the value of a given relevance factor. Server 112 may provide default values for any of the filters for which the user has not selected a setting.

Server 112 uses the message filtering program 226 to sum the values of the relevance factors so that the respective assigned message is associated with a single score, according to certain embodiments (706). In the case of using time slices, the above filtering operations are performed on the plurality of messages in the bundle of assigned messages for a given time slice for the respective user.

The scored messages are merged with pending messages, if any (708). Pending messages are scored messages that are in a queue waiting for to be sent to the user. The merged set of scored messages is sorted based on the scores.

The server uses message transmission program 228 to transmit the sorted messages at an appropriate transmission rate to client 102 associated with the respective user (710). The messages with the highest scores are sent first. According to certain embodiments, messages with scores below a pre-selected score are discarded. According to certain other embodiments, pending messages are timed out after a pre-selected period of time.

According to some embodiments, the chat system may re-broadcast messages that exceed a pre-selected threshold of popularity in order to disseminate such messages to a larger audience. For example, if the chat system detects that message M receives tracking request that exceed a pre-selected amount and/or the message receives positive feedback above a pre-selected threshold, message M is re-broadcast to a set of users who have not previously received message M. Feedback regarding received target messages and/or regarding the author of the target messages are described in greater detail herein with reference to FIG. 10, FIG. 11 and FIG. 12.

Figure 8:
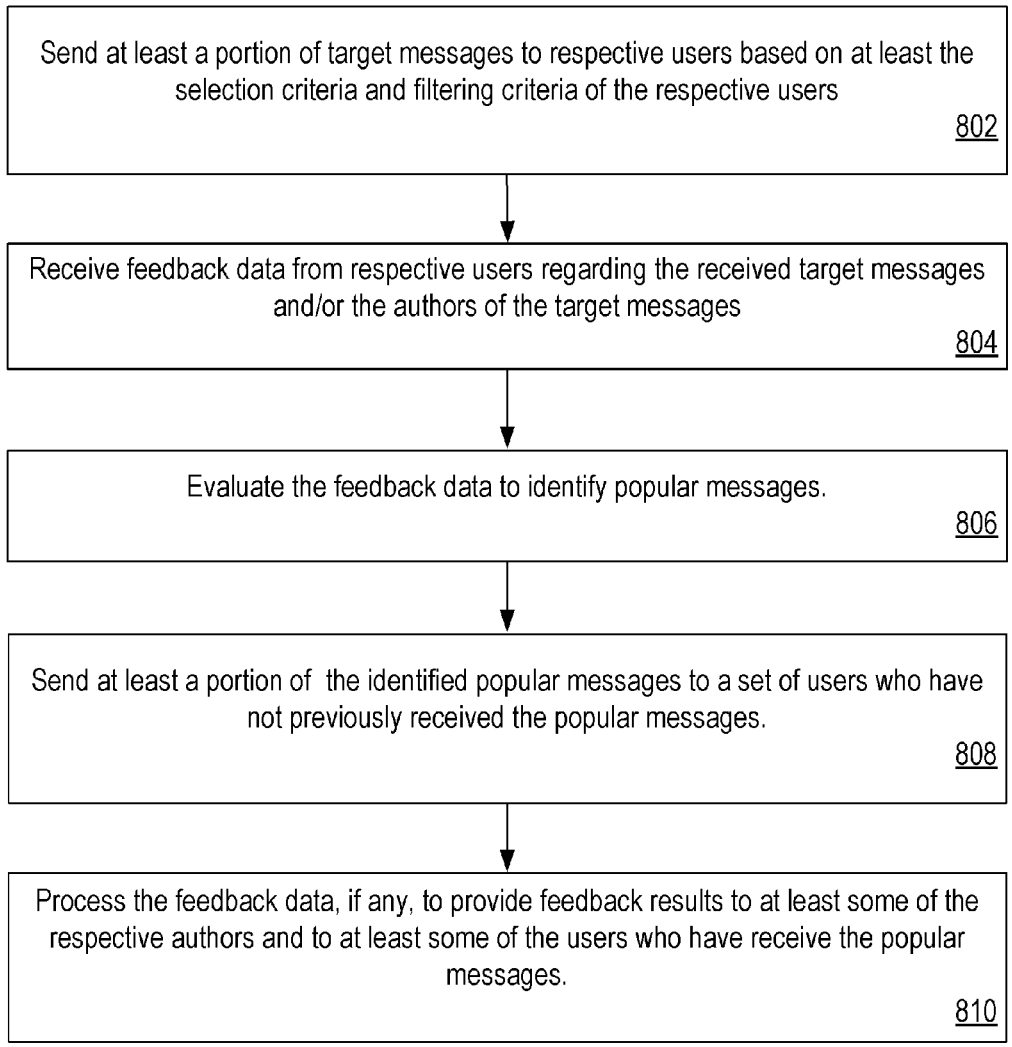
FIG. 8 is a high-level flowchart representing some of the steps for disseminating popular messages to a larger audience in the chat system, according to certain embodiments of the invention.

FIG. 8 is a high-level flowchart representing some of the steps for disseminating popular messages to a larger audience in the chat system, according to certain embodiments of the invention. It will be appreciated by those of ordinary skill in the art that one or more of the acts described may be performed by hardware, software, or a combination thereof, as may be embodied in one or more computing systems. At least a portion of target messages is sent to respective users based on at least the selection criteria and the filtering criteria of the respective users (802). Feedback data is received from the respective users regarding the received target messages and/or regarding the authors of the received target messages (804). The feedback data is evaluated to identify popular messages (806). At least a portion of the identified popular messages are sent to a set of users who have not previously received the popular messages (808). Feedback data is processed to provide feedback results to at least some of the respective authors and to at least some of the users who receive the popular messages (810).

According to certain embodiments, messages that are advertisements that the system would like to send to a respective user are not subject to the message selection and filtering process and are automatically sent to the respective user as a high priority target message. However, according to some other embodiments, advertising messages may be selected based on the selection criteria in the user's focus specification.

Figure 9:
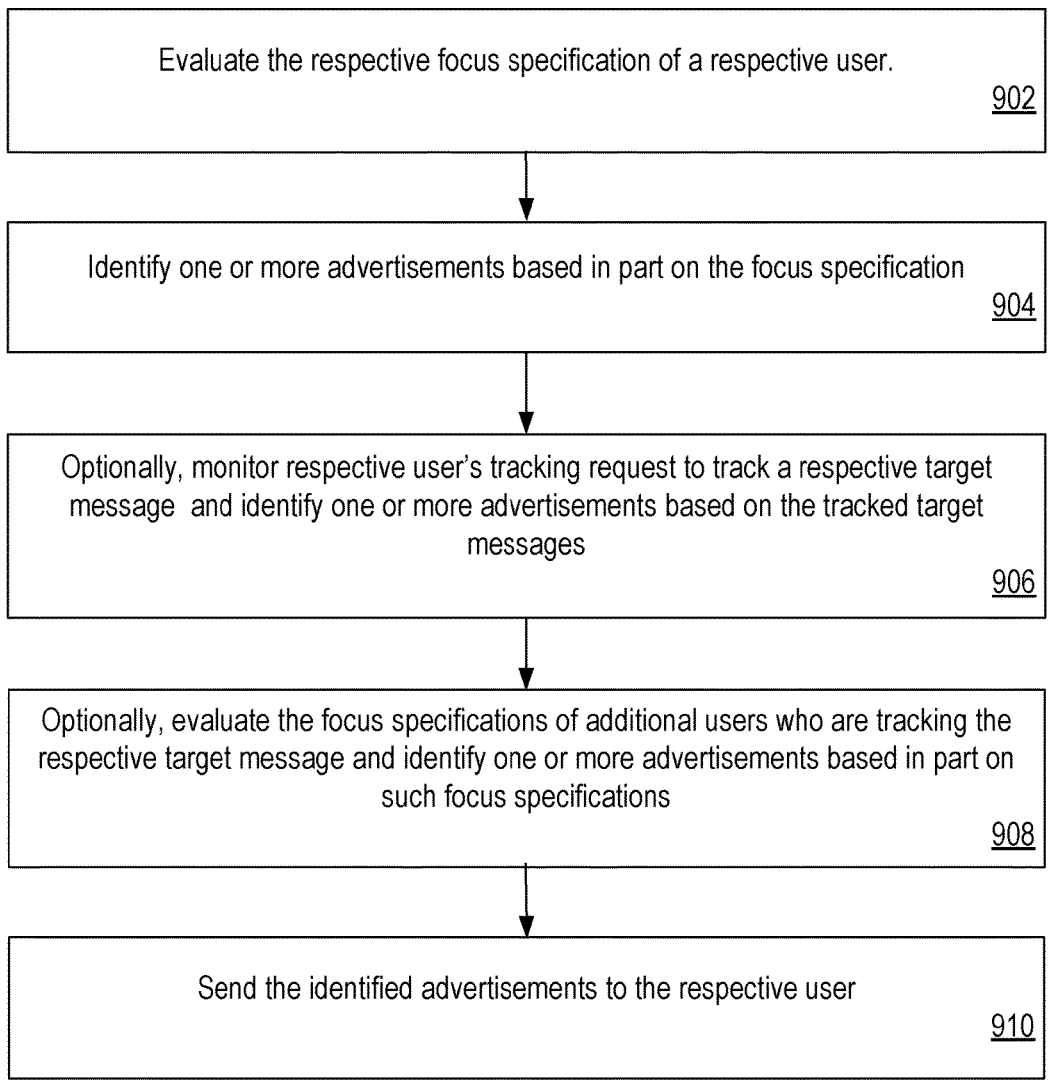
FIG. 9 is a high-level flowchart representing some of the steps for sending advertising messages to a respective user in the chat system, according to certain embodiments of the invention.

FIG. 9 is a high-level flowchart representing some of the steps for sending advertising messages (advertisements) to a respective user in the chat system, according to certain embodiments of the invention. It will be appreciated by those of ordinary skill in the art that one or more of the acts described may be performed by hardware, software, or a combination thereof, as may be embodied in one or more computing systems. The focus specification of the respective user is evaluated (902). One or more advertisements are identified based in part on the respective user's focus specification. Optionally, the respective user's tracking requests to track messages are monitored in order to identify advertising messages based on the tracked messages (906). Optionally, the focus specifications of additional users who are tracking the same target messages that the respective user is tracking are evaluated to identify advertising messages based in part on such focus specifications (908). The identified advertising messages are sent to the respective user (910).

Figure 10:
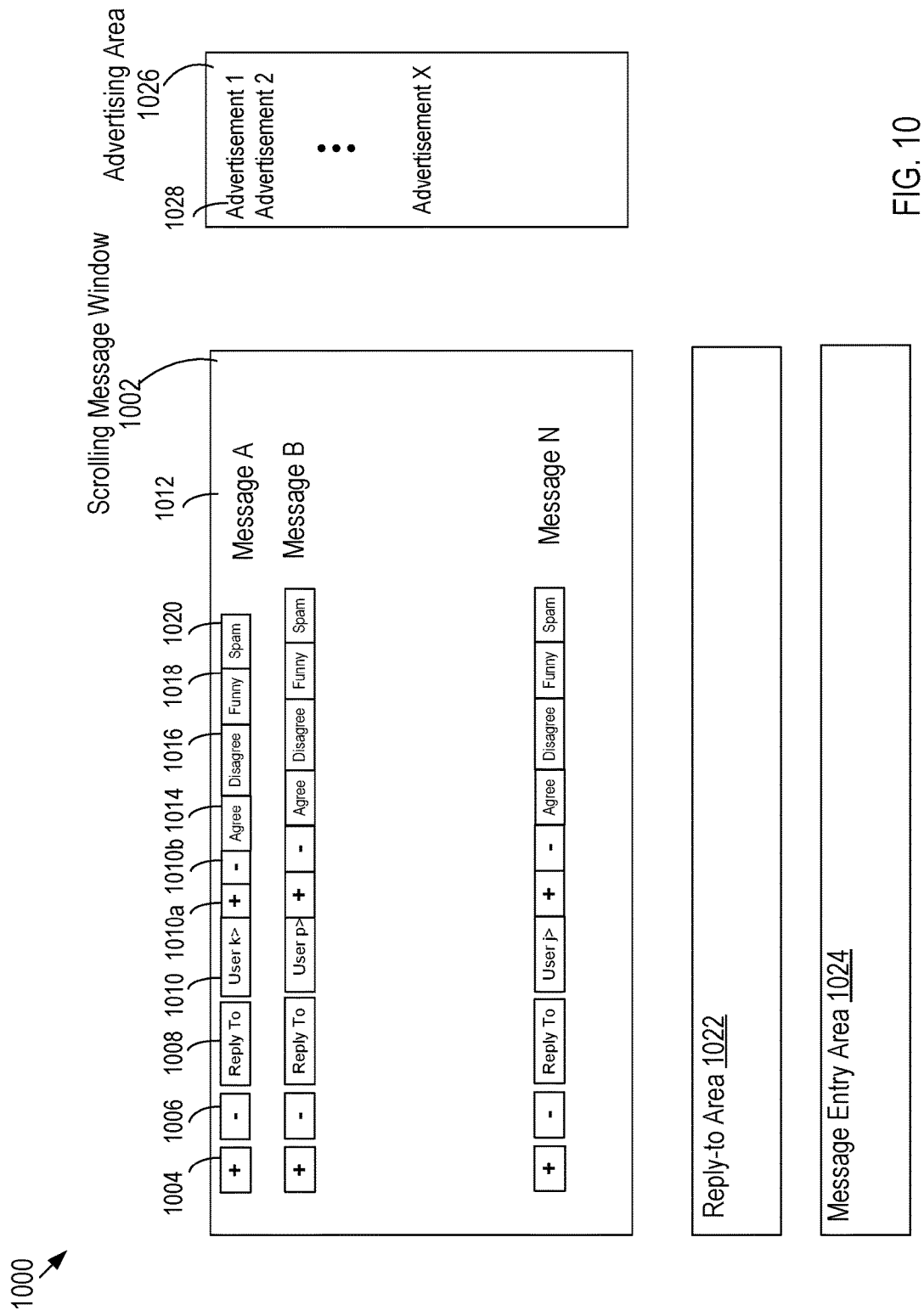
FIG. 10 is one schematic of a chat GUI for displaying target messages to the user, according to certain embodiments of the invention.

FIG. 10 is a schematic illustration of a chat GUI 1000 for displaying messages to the user, according to certain embodiments of the invention. Client chat application program 330 manages GUI 1000, according to some embodiments. GUI 1000 includes a scrolling message window 1002, a message entry area 1024, a reply-to area 1022, and an advertising area 1026. Advertising area 1026 is for displaying advertising messages such as advertising messages 1028 that are sent to the respective user by the chat system. Advertising messages may be selected based on selection process as described herein with reference FIG. 9. The embodiments are not limited to the features shown in FIG. 10, and thus may vary from implementation to implementation.

As a non-limiting example, the scrolling message window 1002 displays target messages 1012 to the user. Incoming target messages are displayed to the user at a reasonable display rate. Older messages are scrolled off the message window to make room for newer messages. According to one embodiment, message 1012 may be preceded by several user-interface buttons such as:

A tracking-on button 1004: the user can begin tracking a given message by clicking on the tracking-on button 1004 that corresponds to the particular message. According to one embodiment, by clicking on tracking button 1004 that corresponds to a message that the user is already tracking, the user can "vote" for such a message as being highly interesting to the user.

A tracking-off button 1006: by clicking once on the tracking-off button 1006 that corresponds to a given message from a tracked thread, the user can stop tracking subsequent messages in the sub-thread of the given message. According to one embodiment, by clicking on the tracking-off button 1006 twice corresponding to a message in a tracked thread, the user can turn off tracking for the entire thread. By clicking the tracking-off button 1006 associated with a message that has not been previously tracked by the user, the user can indicate that the user does not wish to receive messages that are similar to the message on which the user clicked. According to certain embodiments, by clicking the tracking-off button 1006 associated with a message that has not been previously tracked by the user, the user creates a selection criterion in the user's focus specification for excluding such messages.

An author button 1010: author button 1010 identifies the author of a given message. Associated with the author button 1010 are voting buttons 1010a ("+" button) and 1010b ("−" button), according to certain embodiments. For example, the user can click on voting button 1010a once corresponding to a given message, when the user wishes to see more messages on the topic of the given message by the author of the given message. As another example, the user can click on voting button 1010a twice when the user wishes to see more messages by the author of the given message on any topic. Clicking on voting button 1010a three times can mean that the user wishes to all subsequent messages by the author of the given message, for example. As yet another example, the user can click on voting button 1010b once to indicate that the user does not wish to see any messages from the corresponding sub-thread, clicking twice to indicate that the system should ignore the corresponding selection criteria in the user's focus specification that caused the given message to be selected, and clicking thrice to indicate that the given message is spam.

Feedback buttons 1014, 1016, 1018, 1020: various feedback buttons may be provided to allow a user to express opinions on the messages such as messages 1012 that scroll through the scrolling message window 1002. According to some embodiments, the user can designate a given message as spam by using a spam feedback button such as feedback button 1020. Non-limiting examples of feedback buttons include buttons for sentiments such as "good", "bad", "funny," "punny," "boring," "redundant," "agree", "disagree", "funny", "cannot understand", "irrelevant", "spam", "obscene", "objectionable", "please continue", "interesting", "uninteresting", etc.

According to alternate embodiments, instead of preceding a given message, the user-interface buttons may be semi-transparent buttons that appear as an overlay on a given message when the user's mouse hovers over the given message. In another embodiment, the buttons may appear at the side of scrolling message window 1002. The embodiments are not limited to the user interface buttons and associated operations described herein. Other appropriate buttons may used for allowing the user to perform desired operations with respect to the selection and display of messages. In certain embodiments, pop-up menus may be used in lieu of or in addition to user interface buttons.

According to certain embodiments, the target messages may be associated with specific display attributes. As a non-limiting example, when tracking is turned on for a given message, the messages in the tracked thread change from a lighter washed out color to a richer tone. As previously described, the user may specify color, font and style for the various selection criteria selected by the user in the user's specification. Further, advertisements may be displayed to the user in the advertising area 1026 using appropriate display attributes to attract the attention of the user. Similarly, "popular" messages may be displayed to the user using distinguishing display attributes.

Message entry area 1024 allows the user to enter a message or reply to a message that is displayed in the scrolling message window 1002. Reply-to area 1022 displays the text of the message to which the user is replying. In one embodiment, the replied-to message (possibly truncated to fit in the area) is copied here for verification purposes the moment the user types the first character of their new message or otherwise indicates that he or she wants to reply to some message.

Figure 11:
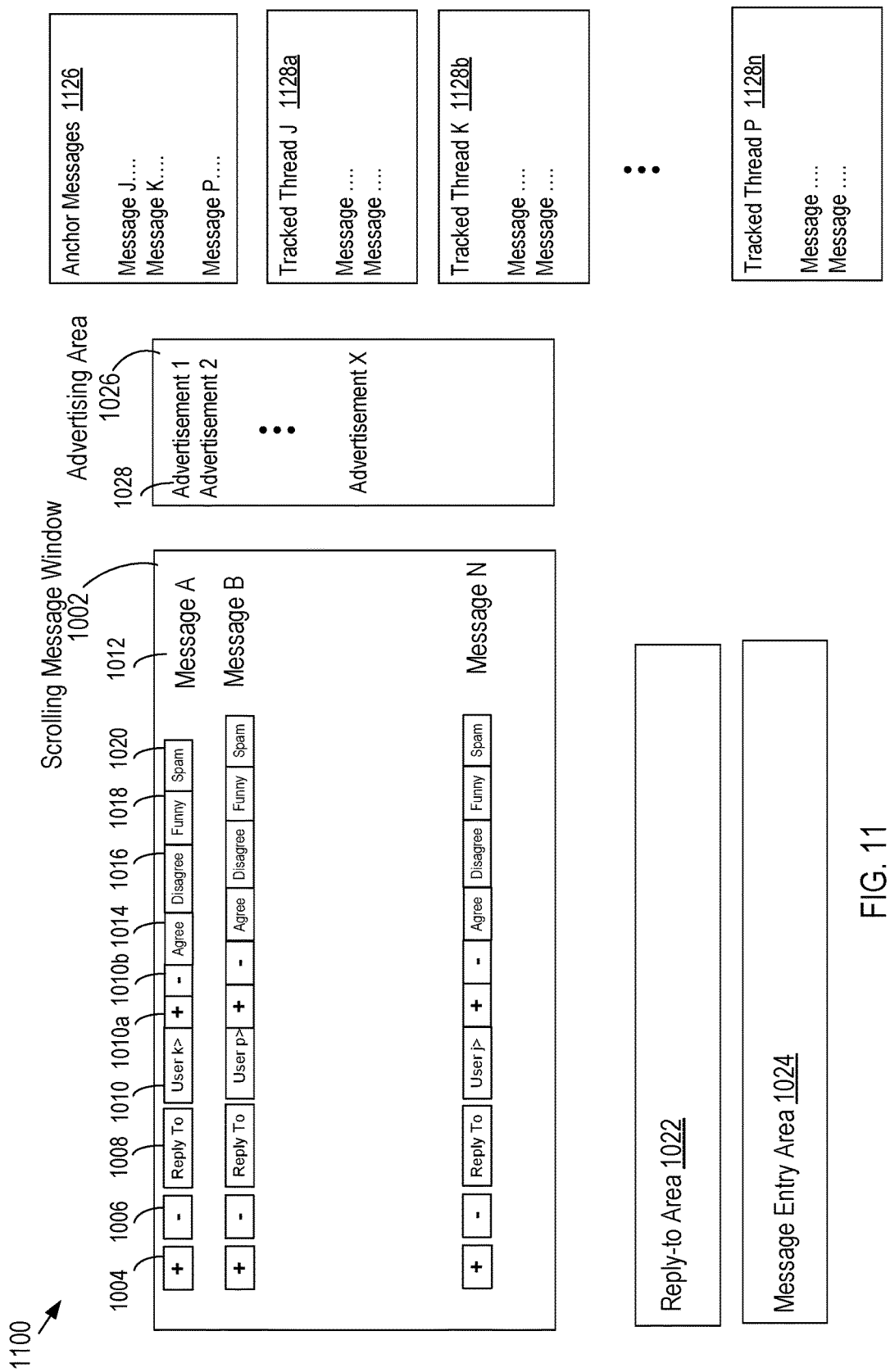
FIG. 11 is an alternate schematic of a chat GUI for displaying target messages to the user, according to certain embodiments of the invention.

FIG. 11 is an alternate schematic illustration of a chat GUI for displaying target messages to the user, according to certain embodiments of the invention. Besides the scrolling message window 1002, reply-to area 1022 message entry area 1024, and advertising area 1028, GUI 1100 shows anchor messages window 1126, tracked threads window 1128a-1128n.

Anchor messages window 1126 displays the anchor messages selected by the user for tracking message threads. The anchor messages window 1126 makes it convenient for the user to terminate tracking one or more message threads. To illustrate, assume that the user decides to terminate tracking the thread associated with anchor message J. Anchor messages window 1126 makes it convenient for the user to terminate tracking such a thread by allowing to user to delete anchor message J from anchor messages window 1126. The user may select several threads at a time for deletion. As another example, the user may close anchor messages window 1126 to delete all the tracked threads previously selected for tracking by the user.

Tracked thread windows 1128 display to the user the target messages that belong to threads that are tracked by the user. For example, tracked thread window 1128a displays the target messages that belong to the thread associated with anchor message J. Similarly, tracked thread windows 1128b, . . . , 1128n display the target messages that belong to the threads associated with anchor message K, . . . , and anchor message P, respectively. For example, if the user terminates tracking the thread associated with anchor message J, tracked message window 1128a would close automatically, according to certain embodiments.

FIG. 12 is another alternate schematic illustration of a chat GUI for displaying target messages to the user, according to certain embodiments of the invention. Besides the scrolling message window 1002, reply-to area 1022 message entry area 1024, advertising area 1028, anchor messages window 1126, and tracked threads windows 1128, GUI 1200 shows a transmission rate slider 1206, a popular slider 1208, a topical slider 1210, a tracked slider 1212, and a plurality of feedback meters 1226, 1228, 1230 and 1232. Further, GUI 1200 shows feedback meters 1226, 1228, 1230 and 1232. Such feedback meters provide a qualitative measure of agreement or disagreement and/or amusement, for example, that the messages authored by the user has generated in the chat community. Feedback meter 1232 indicates a measure of "spam" votes that are received in response to the messages authored by the user. GUI 1200 may have other types of feedback meters, in addition to, or in lieu of the ones shown in GUI 1200. Other types of feedback meters include meters for expressing sentiments such as "good", "bad", "funny," "punny," "boring," "redundant," "agree", "disagree", "funny", "cannot understand", "irrelevant", "spam", "obscene", "objectionable", "please continue", "interesting", "uninteresting", etc. In some embodiments, the set of meters that are displayed are under the user's control. The message feedback also can be made available to any user for any indicated message, and not only to the author of a message. This can be accomplished by the user selecting some message and (through suitable means) requesting that the meters display the feedback for that specific message.

The user can use transmission rate slider 1206 to control the overall rate of transmission of target messages to the user. Similarly, the user can use popular slider 1208, topical slider 1210, and tracked slider 1212 to control the mixing ratios of popular, topical and tracked target messages, respectively, to the user. Such sliders are also referred to as message fraction sliders. The user setting for the rate slider 1206, popular slider 1208, topical slider 1210, and the tracked slider 1212 may be stored in data structure 400 (rate slider 408) as illustrated in FIG. 4, according to certain embodiments. Note that in some embodiments the slider settings may be advisory only, and the system may return a different mixture, as traffic warrants.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method, comprising:
at an electronic device having one or more processors, a display, and memory storing one or more programs for execution by the one or more processors:
obtaining a plurality of messages in a communication system, the plurality of messages including one or more target messages authored by a particular user account associated with the electronic device;
obtaining a determination as to whether the plurality of messages includes at least one priority message authored by the particular user account, the at least one priority message having an advertising content type distinct from a second content type of the one or more target messages; and
in accordance with a determination that the plurality of messages includes at least one priority message authored by the particular user account, displaying on the display a user interface for the communication system, including:
displaying within the user interface at least a subset of the one or more target messages authored by the particular user account;
displaying within the user interface the at least one priority message authored by the particular user account, including displaying the at least one priority message with a first display attribute that differs from second display attributes of the one or more target messages; and
displaying within the user interface feedback for the at least one priority message, the feedback indicating a popularity of the at least one priority message.

2. The method of claim 1, further comprising:
identifying a second set of one or more messages in the communication system, wherein the second set of messages are identified based at least in part on a focus specification of the particular user account; and
displaying the second set of messages in the user interface.

3. The method of claim 1, wherein displaying the user interface includes:
displaying the at least one priority message in a first display area of the user interface; and
displaying the at least a subset of one or more target messages in a second display area of the user interface, distinct from the first display area.

4. The method of claim 1, further comprising:
detecting a user selection of a particular message displayed in the user interface; and
in response to the detected user selection of the particular message, displaying feedback results corresponding to the particular message.

5. The method of claim 1, wherein the feedback for the at least one priority message indicate a measure of spam votes received by the at least one priority message.

6. The method of claim 1, wherein at least one display attribute of the at least one priority message is based on the feedback for the least one priority message.

7. The method of claim 1, wherein the at least one priority message comprises an advertising message.

8. A computer system of a communication system, comprising:
a display;
one or more processors; and
memory storing one or more programs for execution by the one or more processors, the one or more programs including instructions for:
obtaining a plurality of messages in a communication system, the plurality of messages including one or more target messages authored by a particular user account associated with the electronic device;
obtaining a determination as to whether the plurality of messages includes at least one priority message authored by the particular user account, the at least one priority message having an advertising content type distinct from a second content type of the one or more target messages; and
in accordance with a determination that the plurality of messages includes at least one priority message authored by the particular user account, displaying on the display a user interface for the communication system, including:
displaying within the user interface at least a subset of the one or more target messages authored by the particular user account;
displaying within the user interface the at least one priority message authored by the particular user account, including displaying the at least one priority message with a first display attribute that differs from second display attributes of the one or more target messages; and
displaying within the user interface feedback for the at least one priority message, the feedback indicating a popularity of the at least one priority message.

9. The computer system of claim 8, wherein the one or more programs further comprise instructions for:
identifying a second set of one or more messages in the communication system, wherein the second set of messages are identified based at least in part on a focus specification of the particular user account; and
displaying the second set of messages in the user interface.

10. The computer system of claim 8, wherein displaying the user interface includes:
displaying the at least one priority message in a first display area of the user interface; and
displaying the at least a subset of one or more target messages in a second display area of the user interface, distinct from the first display area.

11. The computer system of claim 8, wherein the one or more programs further comprise instructions for:
detecting a user selection of a particular message displayed in the user interface; and
in response to the detected user selection of the particular message, displaying feedback results corresponding to the particular message.

12. The computer system of claim 8, wherein at least one display attribute of the at least one priority message is based on the feedback for the least one priority message.

13. The computer system of claim 8, wherein the at least one priority message comprises an advertising message.

14. The computer system of claim 8, wherein the feedback for the at least one priority message indicate a measure of spam votes received by the at least one priority message.

15. A non-transitory computer-readable storage medium including one or more programs for execution by one or more processors of a computer system having a display, the one or more programs including instructions for:
obtaining a plurality of messages in a communication system, the plurality of messages including one or more target messages authored by a particular user account associated with the electronic device;
obtaining a determination as to whether the plurality of messages includes at least one priority message authored by the particular user account, the at least one priority message having an advertising content type distinct from a second content type of the one or more target messages; and
in accordance with a determination that the plurality of messages includes at least one priority message authored by the particular user account, displaying on the display a user interface for the communication system, including:
displaying within the user interface at least a subset of the one or more target messages authored by the particular user account;
displaying within the user interface the at least one priority message authored by the particular user account, including displaying the at least one priority message with a first display attribute that differs from second display attributes of the one or more target messages; and
displaying within the user interface feedback for the at least one priority message, the feedback indicating a popularity of the at least one priority message.

16. The non-transitory computer-readable storage medium of claim 15, wherein the one or more programs further comprise instructions for:
identifying a second set of one or more messages in the communication system, wherein the second set of messages are identified based at least in part on a focus specification of the particular user account; and
displaying the second set of messages in the user interface.

17. The non-transitory computer-readable storage medium of claim 15, wherein displaying the user interface includes:
displaying the at least one priority message in a first display area of the user interface; and
displaying the at least a subset of one or more target messages in a second display area of the user interface, distinct from the first display area.

18. The non-transitory computer-readable storage medium of claim 15, wherein the one or more programs further comprise instructions for:
detecting a user selection of a particular message displayed in the user interface; and
in response to the detected user selection of the particular message, displaying feedback results corresponding to the particular message.

19. The non-transitory computer-readable storage medium of claim 15, wherein at least one display attribute of the at least one priority message is based on the feedback for the least one priority message.

20. The non-transitory computer-readable storage medium of claim 15, wherein the at least one priority message comprises an advertising message.

* * * * *

UNITED STATES PATENT AND TRADEMARK OFFICE
CERTIFICATE OF CORRECTION

PATENT NO. : 10,225,229 B2
APPLICATION NO. : 15/434021
DATED : March 5, 2019
INVENTOR(S) : Anderson Page 1 of 1

It is certified that error appears in the above-identified patent and that said Letters Patent is hereby corrected as shown below:

On the Title Page

Item (57) ABSTRACT, Line 7, please delete "messages includes" and insert --messages include--;

Item (57) ABSTRACT, Line 10, please delete "messages includes" and insert --messages include--;

In the Claims

Claim 1, Column 18, Line 13, please delete "having an advertising content" and insert --having a first content--;

Claim 5, Column 18, Line 55, please delete "message indicate" and insert --message indicates--;

Claim 8, Column 19, Line 8, please delete "in a communication" and insert --in the communication--;

Claim 8, Column 19, Line 11, please delete "with the electronic" and insert --with an electronic--;

Claim 8, Column 19, Line 15, please delete "having an advertising content" and insert --having a first content--;

Claim 14, Column 19, Line 64, please delete "message indicate" and insert --message indicates--;

Claim 15, Column 20, Line 10, please delete "having an advertising content" and insert --having a first content--.

Signed and Sealed this
Fourteenth Day of May, 2019

Andrei Iancu
*Director of the United States Patent and Trademark Office*